United States Patent
Vargas et al.

(10) Patent No.: US 9,928,359 B1
(45) Date of Patent: Mar. 27, 2018

(54) SYSTEM AND METHODS FOR PROVIDING SECURITY TO AN ENDPOINT DEVICE

(71) Applicant: Security Together Corporation, Roseville, CA (US)

(72) Inventors: Anthony Joseph Vargas, Roseville, CA (US); Christopher Robert Sharpe, San Jose, CA (US); Hollis Ann Johnson, Tahoma, CA (US)

(73) Assignee: SECURITY TOGETHER CORPORATION, Roseville, CA (US)

( * ) Notice: Subject to any disclaimer, the term of this patent is extended or adjusted under 35 U.S.C. 154(b) by 145 days.

(21) Appl. No.: 14/800,579

(22) Filed: Jul. 15, 2015

(51) Int. Cl.
| | |
|---|---|
| G06F 21/00 | (2013.01) |
| G06F 21/42 | (2013.01) |
| H04L 29/06 | (2006.01) |
| G06F 21/78 | (2013.01) |
| G06F 21/71 | (2013.01) |
| G06F 21/50 | (2013.01) |

(52) U.S. Cl.
CPC ............ G06F 21/42 (2013.01); G06F 21/50 (2013.01); G06F 21/71 (2013.01); G06F 21/78 (2013.01); H04L 63/1441 (2013.01); H04L 63/308 (2013.01)

(58) Field of Classification Search
None
See application file for complete search history.

(56) References Cited

U.S. PATENT DOCUMENTS

| | | | |
|---|---|---|---|
| 5,892,900 A | 4/1999 | Ginter et al. | |
| 5,918,194 A * | 6/1999 | Banaska | G01D 3/022 340/3.1 |
| 7,890,925 B1 * | 2/2011 | Wyatt | G06F 8/20 717/106 |
| 8,904,188 B2 | 12/2014 | Maheshwari et al. | |
| 2004/0184610 A1 * | 9/2004 | Campbell | H04K 1/00 380/54 |
| 2007/0174400 A1 * | 7/2007 | Cai | H04L 12/14 709/206 |
| 2007/0291767 A1 * | 12/2007 | Smith | H04L 47/10 370/395.21 |
| 2010/0310068 A1 * | 12/2010 | Fischer | H04N 7/1675 380/43 |

(Continued)

*Primary Examiner* — Hadi Armouche
*Assistant Examiner* — Andrew Steinle
(74) *Attorney, Agent, or Firm* — Inventive Patent Law P.C.; Jim H. Salter

(57) ABSTRACT

Described are architectures, systems, processes and methods for security that, at their core, are adaptive and changing at determined intervals so as to present a different environment, a portion of which is a varied attack surface, to the communications world exterior to the system. In one aspect is described improved security architecture, system and methods based upon multiple processors, operating systems and communication channels, in which at least some processors each perform as an input system connectable to a network, and are dissimilar in some manner, the manner of dissimilarity being controlled by a control system that is not connected to the network. Additionally in this aspect, an execution system is included which performs execution based upon received inputs to the input system, which are passed to the execution system once validated as being safe and not compromised.

46 Claims, 19 Drawing Sheets

(56) References Cited

U.S. PATENT DOCUMENTS

| | | | |
|---|---|---|---|
| 2011/0271112 A1* | 11/2011 | Bajko | H04L 29/12924 713/168 |
| 2011/0302646 A1* | 12/2011 | Ronda | H04L 9/3213 726/9 |
| 2013/0283296 A1* | 10/2013 | Brown | G06F 11/3466 719/318 |
| 2014/0325239 A1* | 10/2014 | Ghose | G06F 9/3851 713/190 |
| 2016/0065612 A1* | 3/2016 | Evans | G06F 21/53 726/22 |
| 2016/0232358 A1* | 8/2016 | Grieco | G06F 21/577 |

* cited by examiner

US 9,928,359 B1

SYSTEM AND METHODS FOR PROVIDING SECURITY TO AN ENDPOINT DEVICE

BACKGROUND

Today's current electronic system architectures have inherent deficiencies that make defending against Cyber attacks extremely difficult and many times impossible. Current electronic architectures are limited in how they can deal with an ever changing array of attacks. Companies focus on making networks or electronic devices more secure. Unfortunately, this strategy can only go so far as the platforms and architectures that these networks and electronic devices rely on are insecure.

SUMMARY

Described are architectures, systems, processes and methods for security that, at their core, are adaptive and changing at determined intervals so as to present a different environment, a portion of which is a varied attack surface, to the communications world exterior to the system.

In one aspect is described improved security architecture, system and methods based upon multiple processors, operating systems and communication channels, in which at least some processors each perform as an input system connectable to a network, and are dissimilar in some manner, the manner of dissimilarity being controlled by a control system that is not connected to the network. Additionally in this aspect, an execution system is included which performs execution based upon received inputs to the input system, which are passed to the execution system once validated as being safe and not compromised.

In another aspect, the described security system keeps a continuous track of network activity and identifies a level of risk associated with various actions. The awareness of the risk for the user helps drive security accountability throughout an organization or individual, thus making an organization or individual more secure.

In another aspect, a multi-channel internal bus that includes parallel communication lines, and which in a preferred embodiment can include messaging that is hashed and converted into optical signals, also exists to provide an even more secure environment.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

Figure 1:
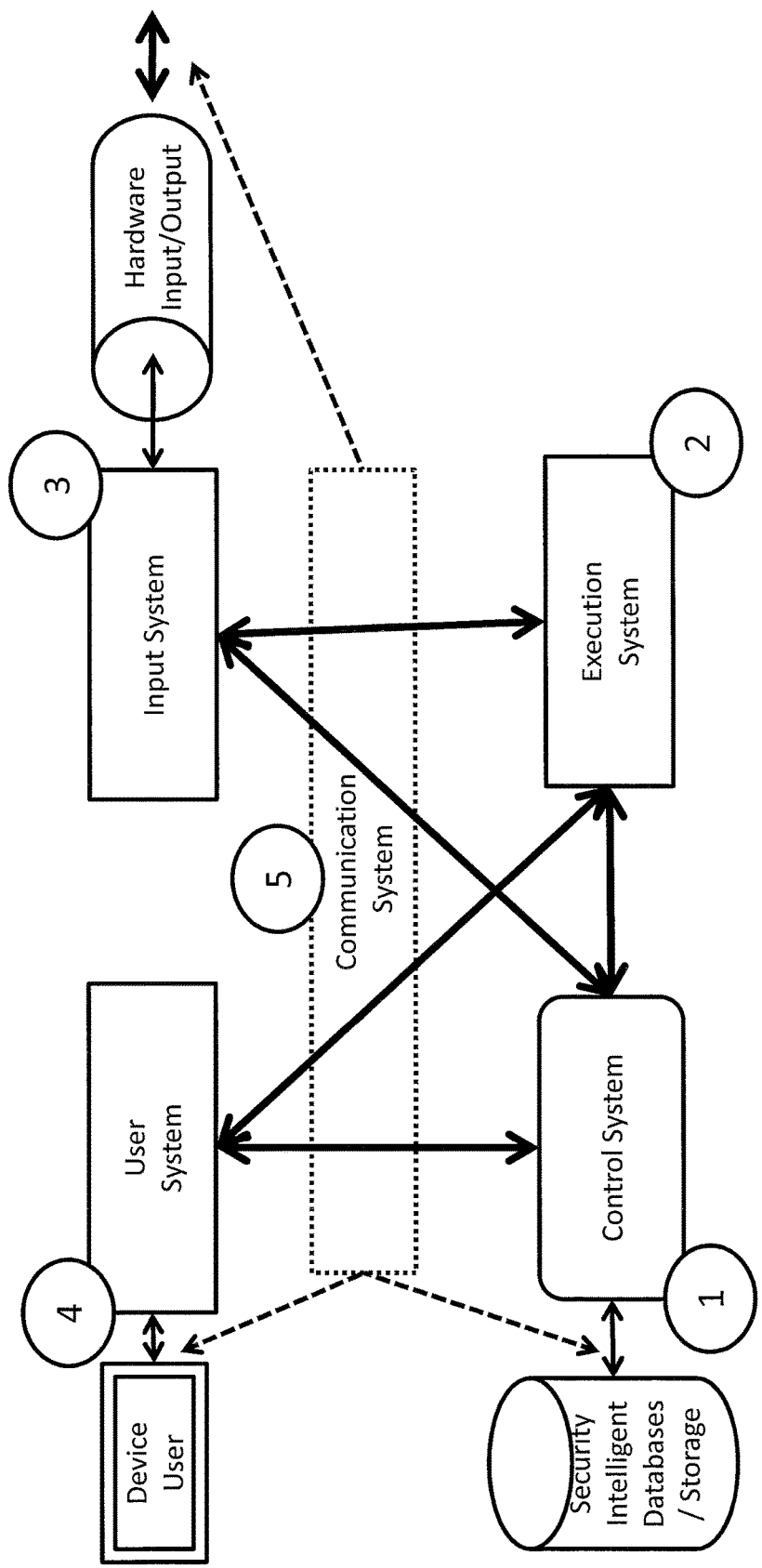
FIG. 1 illustrates the high-level architecture according to embodiments.

Currently, some of the most significant cyber attacks against systems are:
Denial of Service attacks
E-mail based (Phishing) attacks
Mobile device attacks
Web based attacks Attacks against a system usually occur on some type of environment that includes an endpoint where an attack gets executed. To break into a system in a conventional system, the attacker only has to be correct once, yet someone who has to protect a system has to be correct almost all the time. To best attack a system, it greatly helps for an attacker to know information about the system he is attacking. The described Dynamic Security Architecture Environment, in which there is component isolation, is also referred to as an DSAE system, keeps attackers at bay by shifting and changing the attack surface so that an attack is much more difficult to occur on the DSAE system, as it is much more difficult to attack a system when you don't know what you are attacking and when the attack surface is continuously changing.

Aspects described in further detail herein are that the DSAE system is based on a modular architecture in which the monitoring input system is hardware isolated from the execution system running an application, and a control system that interfaces between the input system and the execution system is not only hardware isolated from both the input system and the execution system, but is also not directly connectable to the external network.

Additionally, a modular system helps the system withstand Cyber Attacks by allowing the system to actively mitigate the attacks in real-time, as will be described herein.

One fundamental flaw in today's architectures is that when a system is compromised there are no checks and balances in place. For instance, the program that checks for a specific vulnerability could potentially itself contain a vulnerability which leads to a system with a single point of failure.

The DSAE architecture described further hereinafter puts in place periodic checks and balances, as described herein. This is different than conventional architectures in the industry because it is a combined architecture, hardware, software and process solution. Current systems have limited protections, which by themselves have been able to be compromised, which has led to a system compromise and thus a loss of availability.

As mentioned previously, the DSAE architecture allows for the attack surface to be continually varied. Contrast this with current electronic devices where an attacker will know the specific attack surface, for example the attacker will know the common Internet browser and applications based on the operating system. So the attacker will know the likely attack surface and hence the attacks which will likely be successful. When running with the DSAE architecture, the adversaries never know exactly what the environment is expected to be or what operating system and applications are running.

The DSAE architecture is also unique in that it has the ability to make intelligent decisions in real time so it reduces the possibility of a single point of failure in the environment, as described herein.

In one particular aspect, the DSAE architecture has the ability to make inquiries about the input units. After receiving answers to those inquiries, the system is able to determine the best environment to run a particular application or input message or file. An DSAE system also obtains forensics about the input so that an attack can be re-created for purposes of evidence.

In addition to determining the safest and most secure execution environment, the DSAE architecture will dynamically assign risk levels so when an input unit requests a specific service the system is able to use historical baselines and customer-determined parameters to make instantaneous decisions on whether and where to run an input unit. Example outcomes are to run in a hardware-isolated environment, to run on multiple hardware-isolated environments or run in an environment which has network access. In addition, more questions can be asked and the environment continually changing, implying a constantly-shifting attack surface. With this changing attack surface an attack that just worked a moment before will likely not succeed a moment later. An DSAE system provides a static risk score and a dynamic risk awareness score. This provides a constant evaluation of the riskiness of certain activities on an DSAE system, and thus can help drive accountability.

Some attacks may not run immediately but rather might be delayed for a certain period of time. When a delayed attack is initially injected into the system it interrogates the hardware and software components at that point in time and determines the attack will be successful. Due to the changing state of the system, when the attack is launched the hardware and software components are likely to be different and therefore the attack will most likely fail.

The DSAE architecture will also track authentication credentials for users and those credentials will be offloaded from the operating system running the authentication. With this offloading, there is limited ability to compromise the credentials eliminating certain types of attacks against the system. Privilege escalations attacks are harder to implement against an DSAE system due to a separation of heightened privileges. Additionally, an DSAE system can create and store dynamically generated passwords so that passwords on an DSAE system always change dynamically without the need for the user to know of all the passwords.

As background, it is important to note that with multiple isolated processors as described herein, substantially real-time determinations can take place regarding whether the system has been compromised, such that within seconds of an attack beginning, counter steps can be taken to address it.

As such, the DSAE architecture has, in embodiments described, this characteristic. On systems without multiple isolated hardware processors, a system has no way to determine in real time whether it has been compromised. Once code loads and executes on a non-isolated chip there is no way for that processor to determine if it is running compromised or malicious code. An DSAE system has the checks and balances so that no, one, single compromise of an isolated processor can bring down the entire system. Other processors will watch the running chip to make sure any compromise is contained, which is particularly useful within Internet of Things (IoT) devices and environments.

With the DSAE architecture in place in a system, there is also the ability to provide an DSAE Assurance Score: This term means providing scores dynamically so the end user or administrator knows the riskiness of their current behavior. The score is calculated both dynamically and statically. The score is computed statically by the organization, data owner or organizational policies for certain tasks. Each task receives a static risk assurance score, which determines allowed DSAE configurations that get created by the use of different DSAE Ingredients. DSAE Ingredients have both static initial DSAE Assurance Scores that get generated based on the scores of known components. After a base DSAE Configuration is created using DSAE Ingredients the score is further calculated based on dynamic variables to the environment, user accounts, tasks, functional workflows, etc. If a DSAE Assurance Score cannot be achieved, a workflow or task will not run without a third-party intervention. DSAE Monitoring. One principle of an DSAE machine is that other hardware components in the system monitor whether a processes compromises a system (and thus the availability of the system). The DSAE Architecture is more than just High-Availability (HA) because it uses stored historical information and dynamic runtime information that is accessed by a different hardware component to determine if a processor was compromised and thus unavailable.

One principle of an DSAE machine is that other hardware components in the system monitor whether a processes compromises a system (and thus the availability of the system). The DSAE Architecture is more than just High-Availability (HA) because it uses stored historical information that is accessed by a different hardware component to determine if a processor was compromised and thus unavailable.

The DSAE system uses an DSAE Protocol that the components and modules within an DSAE system use to communicate. The protocol is a dynamic protocol, as described herein, that can change based on the environment, workloads, data sets and variances in system performance. The protocol adapts transparently based on dynamic needs, and preferably does this by adding a header to normal internal message, which internal messaging also passes received external data. The added head may contain, for example, additional fields such as message type, priority, ratings, priority classification. A message type will be, for example "stop sending these messages type" or a "continue sending these messages type"; ratings will be like those of a movie, and priority having a time-sensitivity based aspect thereto; whereas confidentiality classification having a sensitivity aspect, such as secret, top secret, etc.

Additionally, the protocol is both an internal DSAE protocol, yet it will also be an open Internet protocol at some point in the future. For now, the protocol has both an Internal and External implementations. Additionally, the protocol is very structured in the messaging format and the state of the protocol is kept track of continually.

The high-level DSAE process flow is illustrated in FIG. 1. The device 10 for which security is desired includes a Control System 1 provides the operational, administration, and management of the entire electronic device. The Execution System 2 provides the platform/infrastructure for application execution on the electronic device. The Input System 3 provides the physical network and peripheral device connections to the external environment to the electronic device. The User System 4 provides a higher-level abstraction than that of a traditional "WINDOWS" user interface for the electronic device. It also includes a Security Terminal which will act as the main interface for security administration and maintenance, as described further herein. The Communication system or multi-channel communications bus 5 provides the internal multi-channel communication lines to transmit along different internal parallel paths, as described further herein, for the data, internal messages and control.

Based on these main high level components, the following general process flow will occur:

a. Input received (an event) from the network or connected device (eg. Open Socket, File mount).
  i. The Input System 3 will interrogate and perform Input Validation on the event. It will communicate via the Communication System 5 with the Control System 1 as needed for additional information.
  ii. Based on existing forensics, the event is deemed safe or not.
  iii. If the event is not safe, additional forensics and actions will be taken to quarantine the event
  iv. If the event is believed safe, the Input Processing Unit 3 will forward information to the Execution System 3 via the Communication System 5, which will execute the request.
  v. If the execution is unsuccessful (eg. unsupported, crash) the Control System 1 will take over and determine next steps (perform recovery actions)
  vi. If the execution was a success, the results will be reported from the Execution System 3 to the Control System 1 via the Communication System 5 for further processing as needed.
b. The Control System 1 will manage events from both the User System 4 and the Input System 3, based on the request, it will perform the following:
  i. If Information is requested, the Control System 1 will read from existing Databases and respond via the Communication System 5 as appropriate
  ii. If an error condition or attack is detected, the Control System 1 will act appropriately (eg. re-resourcing, resetting, reloading, quarantine)
  iii. If a successful event from the Input System 3 or User System 4 is received, it will also perform any additional validation based on its available data (eg. Existing forensics, known vulnerabilities)
  iv. If additional information is required from the Input System 3 and/or the User System 4, it will request as such via the Communication System 5.
  v. If the event is deemed unsafe, it will execute a Termination Sequence, which would include collecting additional Forensics and quarantining the event.
  vi. If the event is deemed safe, processing will continue on the Execution System 3.
  c. The Control System 1 will setup communication channels within the via the Communication System 5 between the Input System 3 and the Execution System 2 for the event to execute.
    i. The Control System 2 will continue to monitor the execution for malicious/unsafe behavior.

Figure 2:
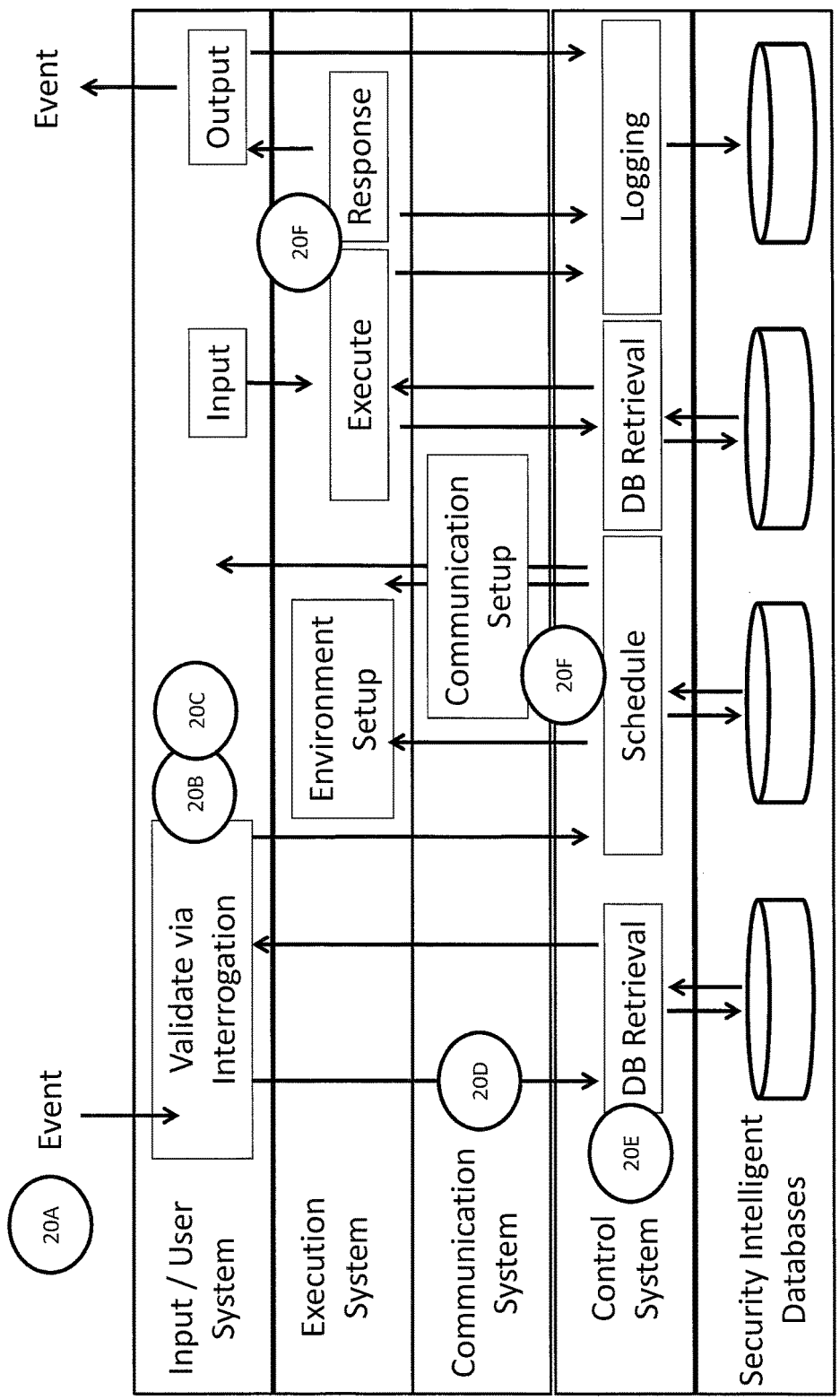
FIG. 2 illustrates the high-level process flow according to embodiments.

A high-level DSAE general process flow is illustrated in FIG. 2, for operation by the DSAE system on an Event, from the input of the Event, to the output to the Event, as shown. As shown, the process flow can be described as:

A. Events are received by the Input System or User System from the Hardware Input/Output (ie. The network or connected device) or the Device User.
B. Events from the Hardware Input/Output are received and validated by the Input System.
C. Events from the Device User are received and validated by the User System.
D. Once Events are initially validated by the Input System or the User System, they are passed to the Control System for further processing.
E. Once received, the Control System will perform additional validation of the Event.
F. If the Event is deemed safe, the Control System will setup the environment and the communications with the Input System and/or User System and the Execution System to process the Event.
G. If the Event is deemed unsafe, the Control System will work with the appropriate Systems to Quarantine or Spoof the Event.

Figure 3:
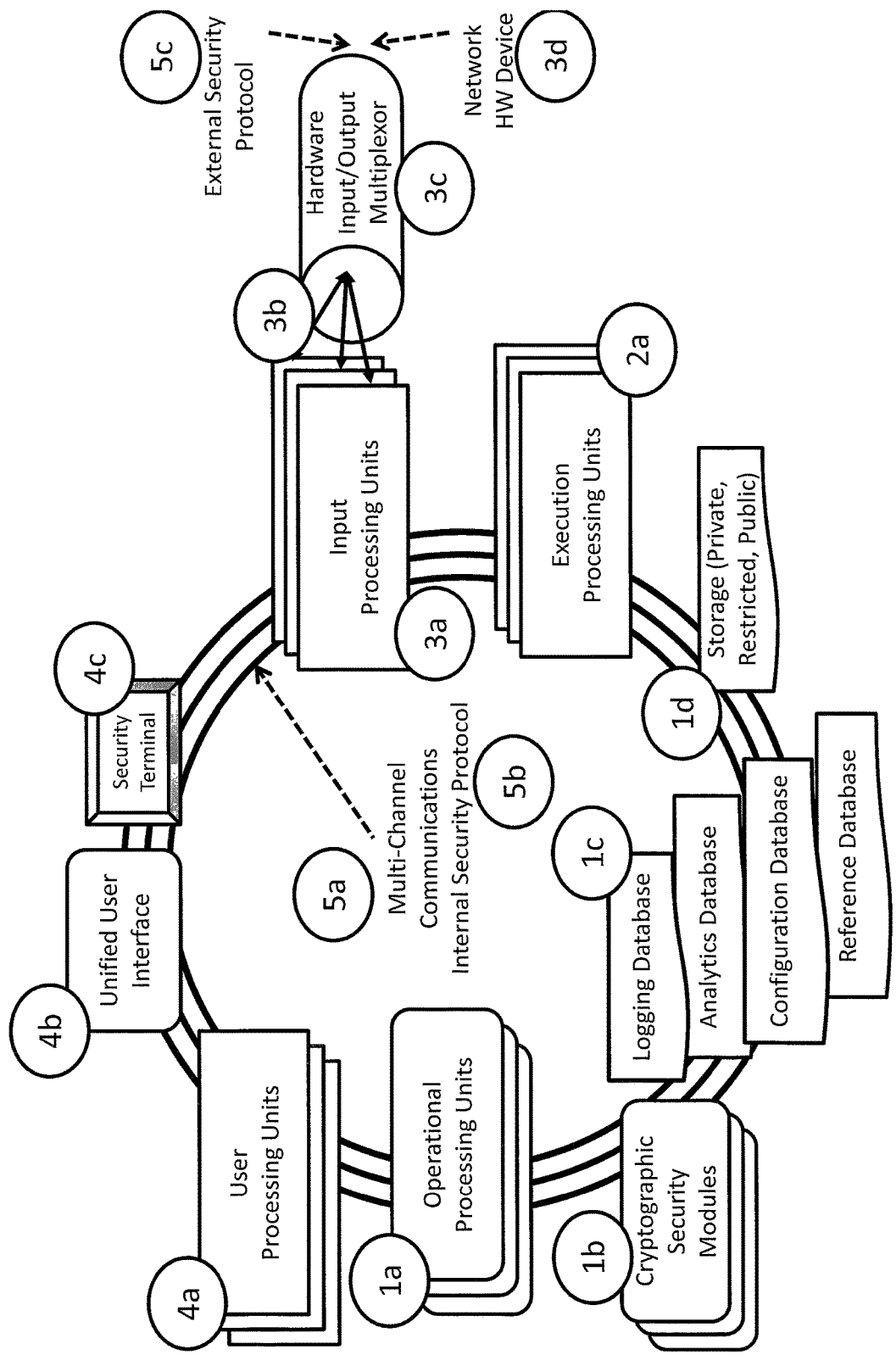
FIG. 3 illustrates a more detailed architecture according to embodiments.

The high-level DSAE architecture is illustrated in FIG. 3, with components having similar or the same functionality referenced using the same numerals, as is done throughout. The DSAE architecture is a multi-component architecture separating management, application execution, and physical input. It also abstracts the traditional user "WINDOWS" interface removing the complexity of configuration reducing security risks through misconfiguration. A shown in FIG. 2, the Control System 1 includes the following:
  a. Operational Processing Units (OPUs)
  b. Cryptographic Security Modules (CSMs)
  c. System Databases
  d. Storage The Execution System 2 includes Execution Processing Units (EPUs) 2a.

The Input System 3 includes the following:
  a. Input Processing Units (IPUs)
  b. Hardware Input/Output (Ethernet, USB, Lightning, Power)
  c. Multiplexor
  d. Network/Input Devices (Flash Drive, Camera, BLUETOOTH)

Figure 4:
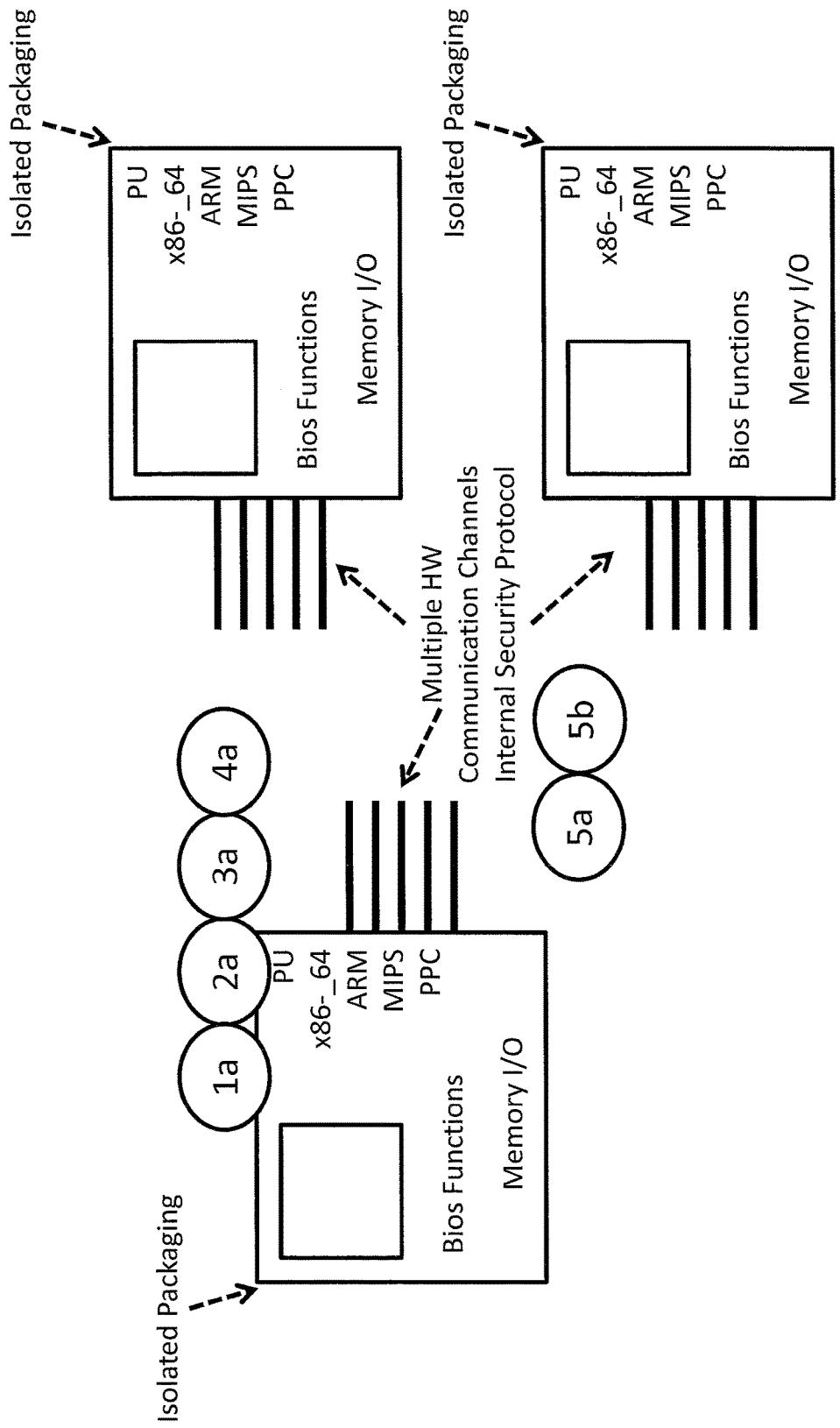
FIG. 4 illustrates a processing unit according to embodiments.
Figure 5:
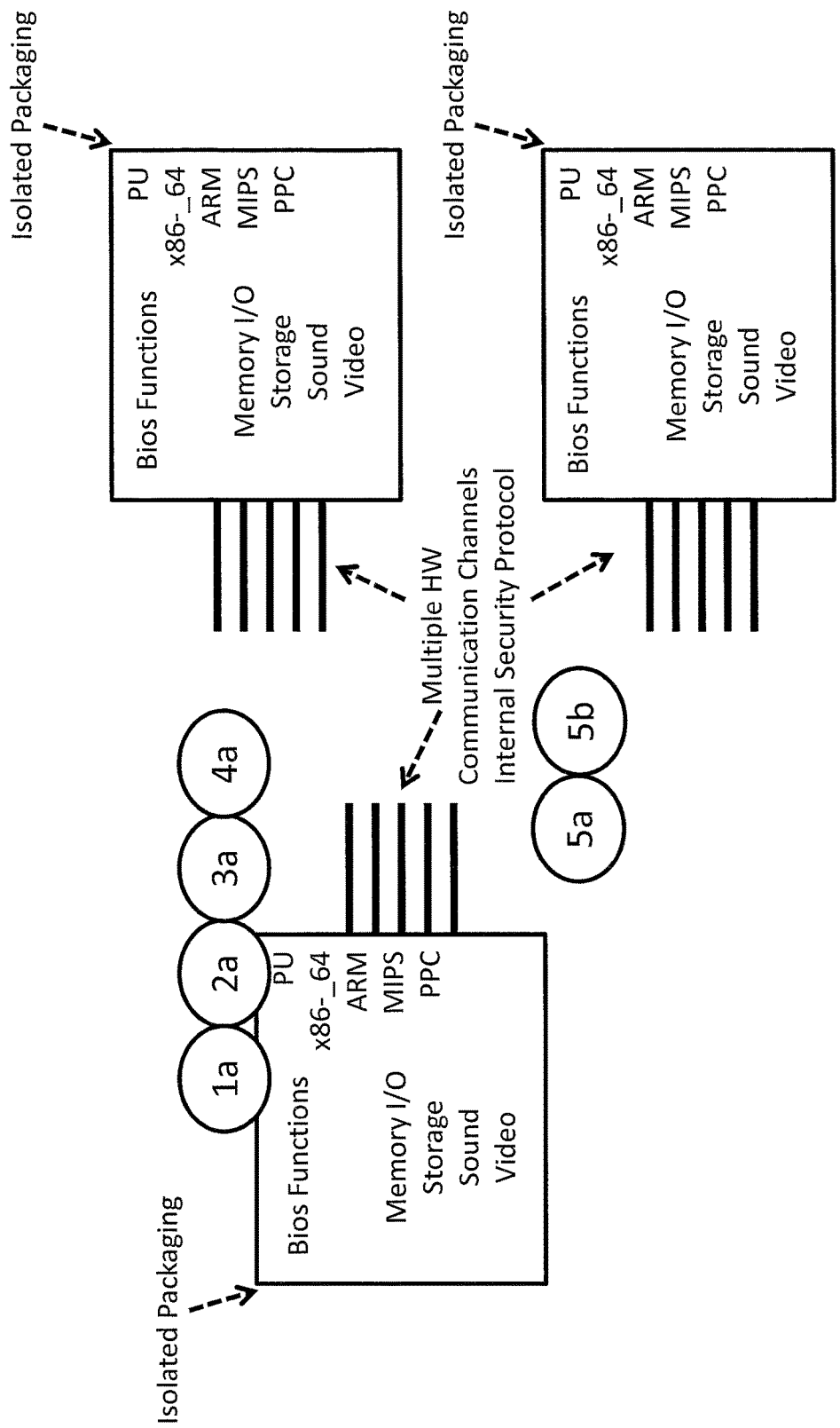
FIG. 5 illustrates a processing unit according to another embodiment.

The User System 4 includes the following:
  a. User Processing Units
  b. Unified User Interface (UUI)
  c. Security Terminal The Multi-Channel Internal Communication Bus 5 includes the following:
  a. Multi-Channel Communications Internal Protocol
  b. Parallel Communication lines and switch circuits/multiplexers with hashing preferably associated therewith and included into the header of all internal data and control transfers, thus providing part of the dynamic protocol, the state of which is controlled by the Control System
  c. External Security Protocol For those Processing Unit configurations that are implemented using separate hardware components, they will use a HW Architecture that can have various specific implementations, such as preferred embodiments illustrated in FIGS. 4 and 5, with each Processing Unit being based on a particular (or multiple within the same chip or packaging) existing CPU architectures (eg. x86_64, ARM, MIPS, PPC), will be hardware isolated, and will contain Memory I/O and Bios Functions. If multiple/redundant processors/components are on the same chip or packaging, they can be initially configures so more than one but not all are used at a time, all are used at a time (which could be one, or multiple), or a different one or ones that are less than all are used, with which ones being used changing over time. Further, this architecture scales from micro to macro levels.

Some embodiments also will contain video chips, local storage and sound processors, as shown on the figures as well.

Control System

Figure 6:
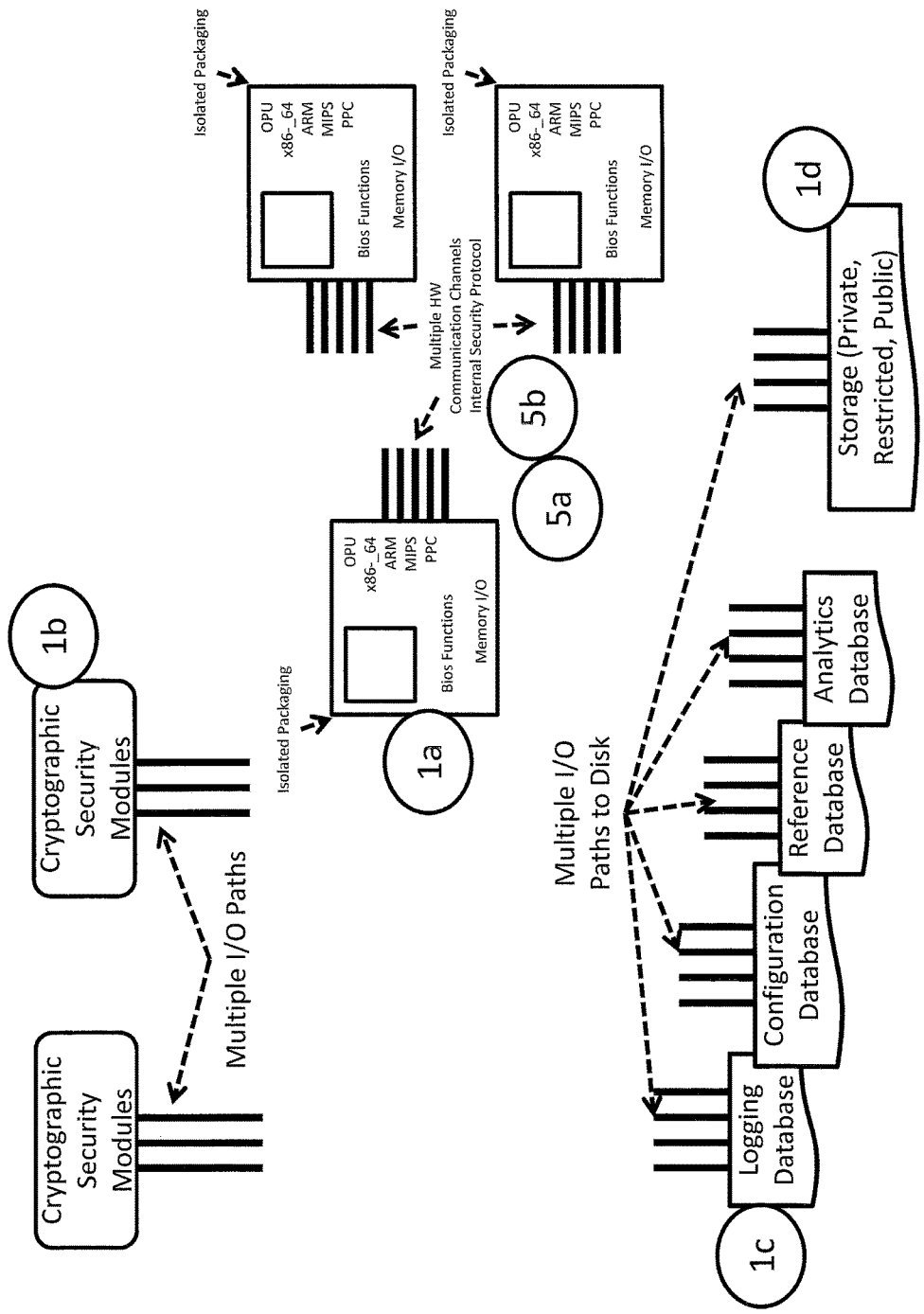
FIG. 6 illustrates a control unit according to embodiments.

The Control System 1 shown in FIG. 1, with operational processing units 1a (also referred to as OPUs), is shown in further detail in FIG. 6 and can be thought of as the "brain" of the system, it is generally responsible for managing all other Systems (Execution, Input, User). Specific responsibilities include:

1. Responding to information queries from the other Systems (Execution, Input, User)
2. Configuration of all internal components
   a. Managing Internal and External communication parameters between system components and network connections.
3. Managing Execution Requests (eg. user, application, network request)
   a. Provides a higher-level (content) analysis of execution requests.
   b. Builds knowledge of what is expected to execute (along with the expected input) of applications/webpages.
   c. Compares what is being requested with what is expected, logs results and raises alarms/warnings as appropriate.
4. Managing Attack Scenarios
5. Managing Component failures/error conditions (monitors health of system components, resets, reloads, informs as appropriate)
6. Managing User and Internal Databases (eg. Forensics, Public, Private: Secret, Top Secret)
7. Managing System Logging, Alarms/Warning notifications/Box level security level (eg. Red, Orange, Yellow, Green)
   a. Ability to run they system at higher security alert levels/don't allow any operations that are not well known and secure.
   b. Sends events and alarms to Security Terminal as necessary.
8. Additional User Input Validation (Higher Awareness when doing non-secure operations (eg. visiting insecure websites) after the User and Input System has done its validation.
   a. Flagging abnormal behavior (large deletion/copy of data).
   b. Ensuring encrypting sensitive data prior to transport.
   c. Commanding secure commands as default (eg. https, ssh), warning and logging when using non-secure commands (eg. http, telnet, rlogin)
9. Interpreting (normalizing, trends: good and bad), creating, and responding to Forensic data (real time events/log interpretation).
10. Maintains application, file, and data (anything acted upon by the system or user) parameters (eg. last to open, when opened, results, hashing info)
    a. Maintains File Call Home data (tracks if a file is being used/opened remotely)
11. Maintains Assurance Scores for specific applications, files and requests (eg. network links/webpage safety, installed applications, downloaded files).
12. Manages traditional security parameters: eg. Authentication/SW licenses/Certificates/Keys/Known Vulnerabilities.
13. Storing and responding to other External Protocol requests
    a. DSAE machines will communicate and share information such as (eg. I'm under attack, stop sending me so much data, etc. . . . )

The overall Control System 1 Component Architecture illustrated in FIG. 6 shows the isolated packaging for each of the Operational Processing Units (OPUs) 1a and 1b. These Processing Units manage all processing in the system, however they do not execute input brought in from either an external Interface or by a user. They run in isolation from the Execution and Input Processing Units, yet they are able to communicate with both: Their Responsibilities include:

i. Setting up the internal communication channels and configures the Input and Execution Processing Units.
ii. Keeping track of historical information and relay that information to Execution and Input Processing Units.
iii. Normalizing the data as needed and performing process checks on new environments as needed.
iv. Monitoring the status of both Execution and Input Processing Units to make sure they are able to provide the needed services they are tasked with.
v. Monitors Heartbeats for components in the system and takes appropriate actions if failures are detected.

Cryptographic Security Modules (CSMs) 1b store some hardware keys. These keys are used by the Control System to bring-up basic system services. The CSM's also send random output down multiple channels, the random output is used by the Operational 1a, Execution 2, Input 3 Processing Units and User Processing Units 4 as needed for random input. Each Operational 1a, Execution 2, Input 3 Processing Unit and User Processing Unit 4 will select an CSM channel at random when it needs random input. Not only will CSM's generate random output, system Processing Units will also generate random information as needed. This provides two-factor randomization and also prevents against random number generator attacks on the Execution node.

The Multi-Channel Communications System or bus 5 has a variety of significant aspects. One is the existence of a multi-channel communications, the other is the internal protocol. With respect to multi-channel communications, a significant aspect described herein is based on securing internal communications. To this end each communications path must be protected from predictability and access, which can lead to an attack. The Input Processing Units 3 or User Processing Units 4 communicate via the control processor 2 with all databases 1d via this communication channel 1c, which is managed by the Operational Processing Units 1a described above. All communications to and from the Input 3, Execution 2, User 4 and Control 1 Systems will be performed across the Internal Communications Paths. Further, all packets do not go down one pipe. Protocol is a parallel protocol. Protocol is hard to defeat due to going down multiple paths, and, in a preferred embodiment, with different hashes being used along different paths, and then a predetermined but randomized sequence selection of the appropriate path. With respect to the internal protocol, it:
  i. Keeps track of hops/packet count.
  ii. All internal messages will be signed so that other Systems know it is valid.
  iii. Location based aware
    1. Use UTC offsets as a packet goes from destination to source to find where the packet went. (Routers/Network equipment/Security require NTP)
    2. Security Protocol will always add additional information into the packet to keep track of where it has been
    3. Classification labels will be written into each packet, such as:
      a. Public, Private, Secret, Top Secret
      b. Ratings (eg. G, PG, PG13) into the packet
        i. Breaks down images, files, videos and creates a rating.
      c. Priority. In certain cases the Controls System will need to send high-priority messages to other components or vice versa. This is when a response is required in a timely manner or even to suspend a misbehaving process.
  iv. ability to hash internal (possibly, and possibly not, otherwise identical) messages with one or possibly each channel with a different hash algorithm, and transmit the messages and their hashes on different communication channels, selecting only the one or ones needed; thereby instituting randomness into the selection of the messaging transmitted on the particular internal communication channels;
  v. List of messages:
    4. Stop sending this DDOS attack
    5. Internal queries between Control, Execution, Input, and User Systems
    6. Sync Certificates
    7. Validate Certificates
    8. Are you there?
    9. Drop input unit (messages, file)
    10. Who is logged into your system?
    11. What are your other network connections?
    12. What is your configuration?
      a. Architecture type and Manufacture
      b. What Is your OS and Ingredients
      c. Reload with this OS and Ingredients.
      d. Run this input unit—Recommended OS, # of cpu, Input unit, source, userid, source operating system, file-system type?

The databases 1c1, 1c2, 1c3, 1c4, 1c5 and 1c6 are identified separately for purposes of discussion, but need not be physically distinct.

The Logging Database 1c1 contains system event data, such as:
  1. Logging of dynamic real-time events going on in the system
  2. Who connected, what they accessed, when, etc.
  3. Communication channel changes
  4. Process Unit ingredient changes
  5. Errors, Warnings, Alarms
  6. Configurations Changes The Configuration Database 1c2:
  i. Contains operating system, user, and application configuration data. As a general design, the Configuration File will be layered, higher-level configurationtaking precedent over more specific configurations.

In a uniform organization the higher-level configuration should suffice and the more specific "configuration knobs", rarely needed. However many organizations are more diverse and may require the ability to generate more specific configurations.
  ii. Having a hierarchy of configurations, will allow for configuration policies to be consistently applied.
  iii. Examples of the types of decision trees to be contained in the Configuration Database are:
    1. Override policy, as examples:
      a. No overrides are permitted
      b. No overrides are permitted except during core hours of 8 am-5 pm M-F
      c. Overrides are permitted and reported to next level management immediately
      d. Overrides are allowed at the lowest level.
    2. Rejection percentage, as examples:
      a. A minimum of 3 separate analyses are required with 2 of 3 passing.
      b. A minimum of 3 separate analyses are required with all 3 passing.
    3. Decision-making responsibility levels, as examples:
      a. Level O-1: Can override rejection of any transaction.
      b. Level O-2: Overrides allowed within the division.
      c. Level O-3: Can only override within her department.
      d. Level D-1: Can set decision-making parameters for any div/dept within the organization.
      e. Level D-2: Can set decision-making parameters for a given division or set of divisions.
  iv. The Configuration File is used to direct next steps. A few examples upon a consensus to reject the input unit include:
    1. Notify the Security Terminal of failure with something was rejected.
    2. Cancel the operation and simply log to the Logging database. No notification is made to the Security Operator.
    3. If the reject recommendation is less than 50%, notify the Security Terminal and let the Security Operator (Admin of the system) make the final decision on execution.

The Reference Database 1c3:
  i. Contains internal and external (network) component configuration data, such as:
    1. Configuration Information database, which keeps track of the operating system, required libraries and other information about what is needed for an environment to work.
    2. Third-party tools databases containing information about other tools that can be leveraged by the system.
    3. Known good/safe applications.
  ii. It also includes element (eg. files, applications, website) attributes, including:
    1. Information used for Forensics such as process information, specific input validation information, historical baselines.

iii. Its broken into internal and external reference data:
iv. Internal Reference Data
 1. Communication channel setups
 2. Active ingredient on the Processing Units
 3. Ingredients Installed on the System
    a. Along with their necessary environment/configuration to run
    b. HW/OS Ingredient Database Ex:

| HW/OS Inventory | PPC | ARM | Etc . . . |
|---|---|---|---|
| Input Validation Engine | 2 | 2 | |
| Execution Engine | 2 | 1 | |
| Win X.Y | No | Supported | |
| OS X A.B.C | Supported | No | | c. Application Ingredient Databases Ex:

| Application | Win X.Y | OS X A.B.C | Etc . . . |
|---|---|---|---|
| DSAE-Word-2010 | Supported | No | |
| DSAE-Word-2012 | Supported | Supported | |

4. Basic file info, who accessed, when, hash, call home info
v. External Reference Data
 5. External communication ports, random IP ports The Analytics Database 1c4:
 i. This database contains a higher-level interpretation of events and component information that can be used to address security breaches, data such as:
    1. Interpretation of system activity (logging), network activity, External Protocol Info about other devices on the network.
    2. Crime endpoint forensics
    3. List of compromised machines
    4. List of known unsafe applications and websites The Private Data Storage 1d:
 i. Private Data such as user credentials that can be classified further, such as:
 ii. Secret, Top Secret The Public Database 1d:
 i. Public Data that anyone can have access to without causing any security concerns.

Execution System

Figure 7:
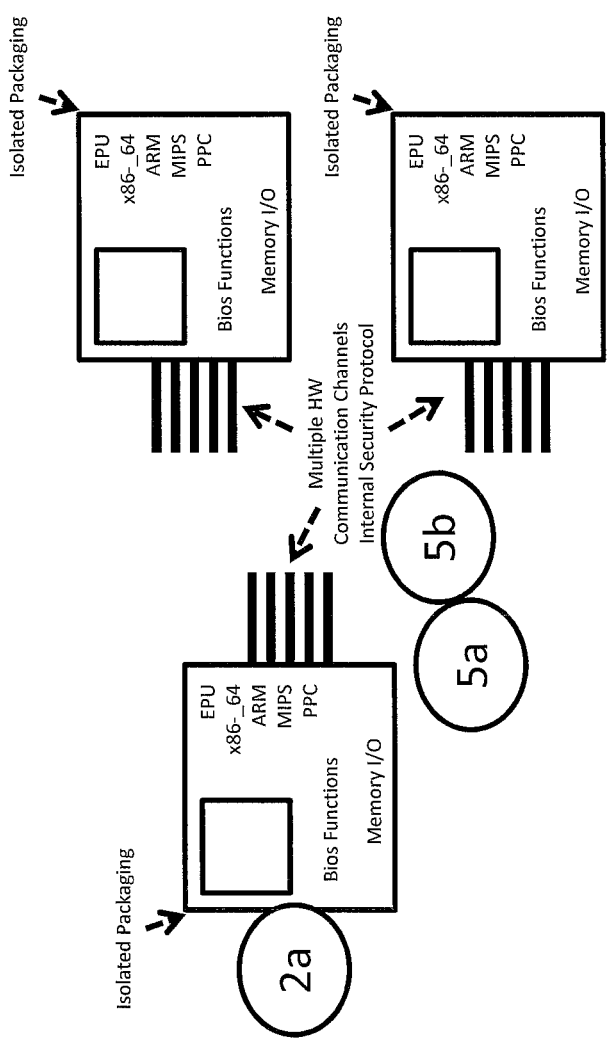
FIG. 7 illustrates an execution unit according to embodiments.

The Execution System 2 as shown in FIG. 1 is responsible for the actual running of the things you would find on a typical laptop or smart phone, eg. the operating system, applications, web browsers, utilities. It is made up of 1 or more Execution Processing Units 2a as shown in FIG. 3. A preferred configuration is multiple Execution Processing Units each of a different processing architecture, all running different operating systems. The Execution System Component Architecture is illustrated in FIG. 7. With respect to this, the execution processing units 2a execute the configuration ingredients provided by the Control System 1. They use the System Device Driver to know which Input Processing Units 3a to communicate with.

The execution processing units 2a will log important information about the Executed environment in a parse-able format that can be examined by the input Processing Units 3a for concerns.

The execution processing units 2a can also ask the input Processing Units 3a questions/inquiries to obtain more details about the input or the process in which it is executing.

Input System

The Input System 3 works semi-independently from other Systems in the device. This is to assure maximum protection from attacks.

One of the components within the Input System 3 is responsible for performing validation of each input unit it receives. Robust and complete input validation is a critical component of a secure endpoint. In fact according to the 2013 OWASP Top 10 compilation the majority of issues leading to attacks were due to weak or incomplete input validation, including Cross Site Scripting (XSS), Cross Site Request Forgeries (CSRF), injection attacks and buffer overflow.

Its main purpose is to keep potentially compromising data out of the system, resulting in a protective barrier for the system. To provide this protective barrier the Input System will reference the Forensic Database and execute Input Validation looking for known vulnerabilities and suspicious activity. Based on this validation, it will give the event an assurance score and pass its recommendations and finding to the Control System for further processing.

Figure 8:
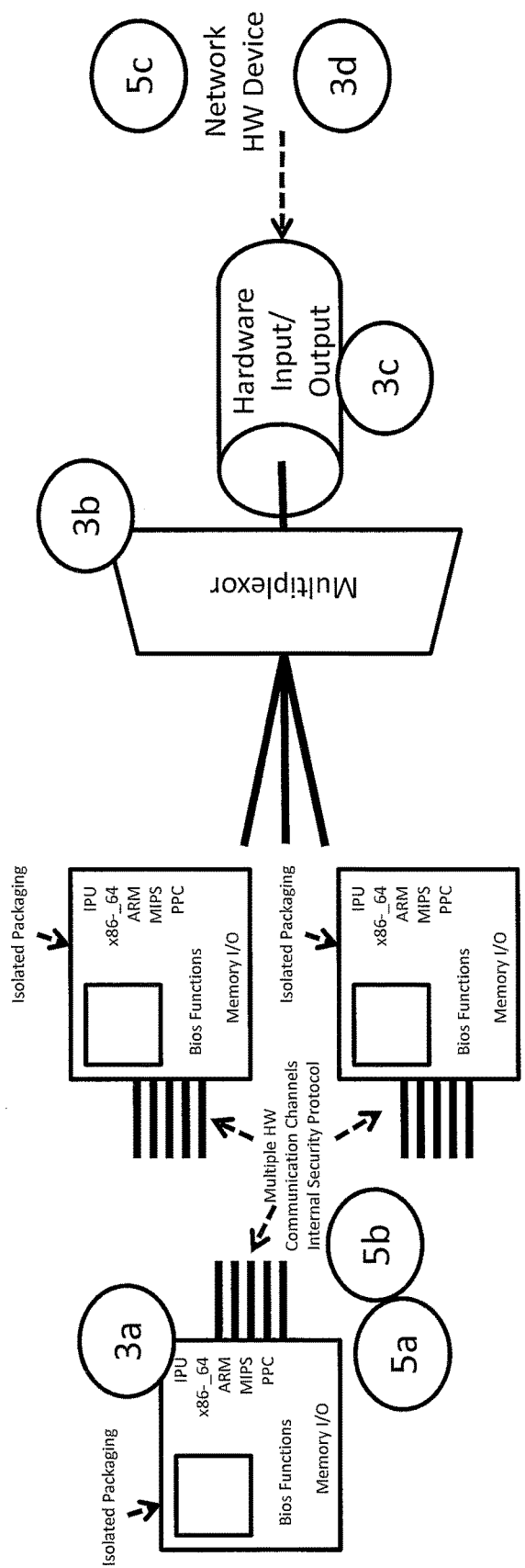
FIG. 8 illustrates an overview of the input system according to embodiments.

The main principles of this invention are:
 Multiple Input Processing Units running differing instruction sets to protect from assembler-level attacks.
 Each Input Processing Unit will run a different operating system or operating system version to provide a continuously changing attack surface.
 Backing Forensic Data Base to support intelligent analysis of the input unit.
 Secure Communication Channels to protect from outside attacks The overall Input System Component Architecture is illustrated in FIG. 8.

Specific responsibilities of the Input System can include:
 1. Physical termination of all Input Events (eg. network and peripheral connections to the Device).
 2. Multiplexing the external Input Events to each Operational Processing Unit.
 3. Interrogation and validation of Events to and from the Device.
    a. It will request additional information from the Controls System as needed.
    b. Will help determine if Events are safe to execute or not based on existing Analytics and knowledge base.
    c. Will compare Events against known vulnerabilities in applicable Operating Systems, applications and their versions.
    d. Will searching for known exploits within an executable Input Events using the Known Malware information.
    e. Will analyze for conformance with and variance from known characteristics for that Event (eg. a Word file, a UPD message).
    f. Will review behavioral information such as userids, locations, and normal working hours.
    g. Will execute runtime fuzzing of the Event.
    h. Will search for executable code within a non-executable Event.
    i. Perform whitelist and blacklist checking (ie. Known safe and unsafe websites/applications/actions).
    j. Will search files for copyrighted information.
    k. Will search files for illegal information (eg. child pornography).
    l. Will perform copy or removal protection of data, to assure integrity. This is accomplished by calculating in advance the amount of data, which should be copied or removed. If this is sensitive data (such as financial information) the copy/removal is denied by indicating the copy/remove is successful in actuality the data is saved to an internal system for preservation and later review.

m. Compare actions to prior actions, such as:
   i. Is this a known user or IP address? Do we know more about the user or ip address now than we did before?
   ii. Has this user or this IP address previously done this action?
   iii. When was the file last opened/accessed/viewed/written/executed?
   iv. What was done last time? Was it modified, written or executed?
   v. Where did it come from last time? For example, did it come from a known network? An External network? Trusted or untrusted network?
   vi. What spoken/written human language is the file written in? For example, is it in Chinese? English? French? Russian? Combination?
   vii. What IP subnet is the data coming from? Is it an internal or external source?

n. The Input System is the first line of defense for network attacks as well as malicious programs executing on any peripheral device such as a USB stick.

o. The Input System may also perform additional validation on Outgoing Events.

4. Sending Input Validation Reports to the Control System.
   a. Includes items such as: file type, source userid and location, date and time of input, the signature if available.
   b. Includes any reason(s) the Event was accepted or rejected.

5. Responding to Information Requests from the Control System.

6. Processing the Event (eg. mount the file system, read the file, send messages to the network)

7. Terminate the Event as commanded (eg. clean-up processes, memory).

8. Report unsupported features, failures, errors, and suspicious behavior to the Control System.

9. Periodically report Status messages to the Control System.

As shown in FIG. 8, the input processing units 3a evaluate trusted and untrusted input into the device, there are one or more in the System. They perform diagnostic and forensic analysis on all input, prior to passing on to the Control System 2 for further processing. They do not execute data that is on sent in from the Input Hardware device, they only analyze and compare the diagnostic and forensic data of the input.

i. Having only one Input Processing Unit is permitted though is not preferred, but will inherently less secure than having more than one.

1) The Input Validation done by the Input Processing Unit or in conjunction with the Control System each Input Processing Unit will receive a copy of the input unit from the replicator/multiplexor. Only one will process the event. The one to process the event will be previously selected by the Control System. The input will be analyzed as follows:
   i. Relevant information will be referenced from the Forensic Database.
   ii. An independent analysis based on Forensic information will be done. Example analyses include:
      1. Comparing input against known vulnerabilities and applicable OS, applications and versions.
      2. Searching for known exploits within an executable input unit using the Known Malware information.
      3. Analyzing for conformance with and variance from known characteristics for that input type (eg. a Word file, a UPD message, etc.)
      4. Reviewing behavioral information such as userids, locations, and normal working hours.
      5. Runtime fuzzing of the input data
      6. Searching for executable code within a non-executable input unit
      7. Perform whitelist and blacklist checking (ie. Known safe and unsafe websites/applications/actions)
      8. Searching files for copyrighted information.
      9. Searching files for illegal information (eg. child pornography).
      10. Copy or removal protection of data, to assure integrity. This is accomplished by calculating in advance the amount of data, which should be copied or removed. If this is sensitive data (such as financial information) the copy/removal is denied by indicating the copy/remove is successful in actuality the data is saved to an internal system for preservation and later review.
      11. Compare actions to prior actions, such as:
         a. Is this a known user or IP address? Do we know more about the user or ip address now than we did before?
         b. Has this user or this IP address previously done this action?
         c. When was the file last opened/accessed/viewed/written/executed?
         d. What was done last time? Was it modified, written or executed?
         e. Where did it come from last time? For example, did it come from a known network? An External network? Trusted or untrusted network?
         f. What spoken/written human language is the file written in? For example, is it in Chinese? English? French? Russian? Combination?
         g. What IP subnet is the data coming from? Is it an internal or external source?
         h. Use the External Protocol in the future to further determine source computer, etc.

2) After the controlling Input Processing Unit has done its validation (in conjunction with the Control System), it will report its recommendations to the Control System for further actions OR it the event will be deemed "unsafe" and appropriate actions will be taken to quarantine the event.

i. Regardless of the acceptance or rejection recommendation, the controlling Input Processing Unit will always:
   1. Collect forensics on the event, items such as the file type, source userid and location, date and time of input, the signature if available
   2. Compile the analysis results, including the reason(s) the input unit was accepted or rejected.

3) Input Processing Units are most likely standard off-the-shelf CPUs, but may also be proprietary hardware.

b. Multiplexor 3b
1) The multiplexor 3b's responsibility is to pass the input event to multiple Input Processing Units. The event is multiplexed for reads so that each (multiple) Input Processing Units can evaluate what the content that is being passed in via the Input hardware.

c. Hardware Input/Output 3*c*
1) The input hardware 3*c* provides signals to the Input Processing Units via the Multiplexor. Standard input hardware is used (eg. Ethernet, USB, utility (mac lightening), power).
d. Network/HW Device 3*d*
1) The inputs are generally: Pipes, Sockets, Blocks, Raw.
2) Input hardware, either standard off-the-shelf or proprietary.
  i. Example input devices are
   1. Raw devices, such as the disk containing an Oracle DB
   2. Block Devices, such as flash drives, disk drives, CD-ROM containing a file system.
   3. Pipe Devices, such as files found on flash drives, disk drives, CD-ROM.
   4. Socket Devices reached across network interface cards such as BLUETOOTH devices, video cards, cameras, and Ethernet.

User System

The User Systems 4 general responsibilities are to provide a Unified Interface to the User, manage System/User Configurations, and provide System Error/Warning/Alarm and Security Administration. It provides high-level security/configuration profiles for easier and less error prone administration. Many security vulnerabilities come from miss-configuration, one major goal with the User System is to remove the complexity of configurations that pertain to security and simplify System configuration.

Figure 9:
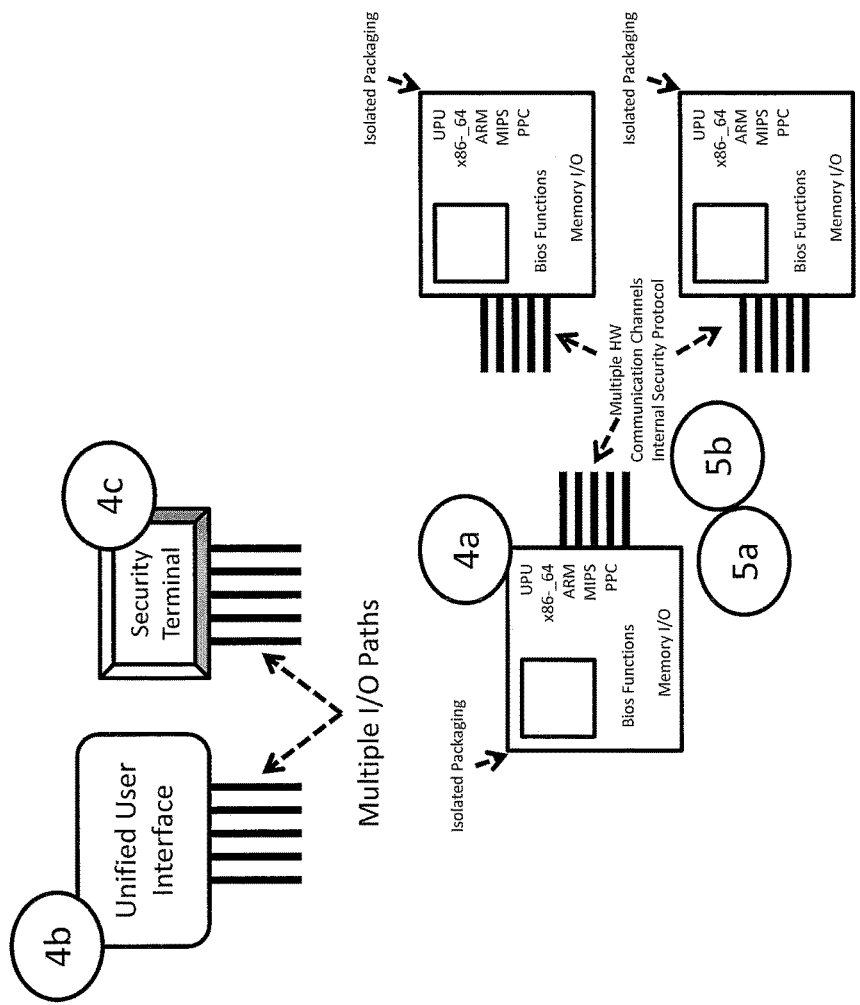
FIG. 9 illustrates a user system according to embodiments.

The overall User System Component Architecture is illustrated in FIG. 9, and includes the User Operating Units 4*a*, the Unified User Interface 4*b*, and the Security Terminal 4*c*. It's simplified and generic so that attackers cannot determine what is running at the lower operating system layers. If attackers do not know what is running behind the scenes it makes it harder to attack the system.

Specific responsibilities include:
1. Providing the physical input Interface for the Device User, this may be direct input using the attached keyboard or remote via desktop/screen sharing
2. Providing a Unified Interface, which abstracts the configuration complexity of a traditional WINDOWS type of interface, but provides the same look and feel.
  a. This Interface will be communicating with different types of underlying operating systems, so will need to be able to translate similar configuration principles to each.
3. Providing a Security Terminal which will act as the main Interface for System Errors/Warnings/Alarms and Security Administration.
4. Providing Security/Configuration Profiles for easier and consistent configurations across Devices.
5. Interrogation and validation of Events from a Device User Input point of view. (cl4*m*-)
  a. It will request additional information from the Control System as needed.
  b. Will help determine if Events are safe to execute based on existing Analytics and knowledge base.
  c. The User System is the first line of defense for attacks from a User logged directly onto the Device. This could be initiating an attack onto the Device itself or initiating an attack to the network. It will verify Device User syntax into webpages, applications, and cli.
  d. Its responsible for validating the Device User credentials and making sure Device User does not have access to resources it is not allowed to access.
  e. It will request information from the Device User to validate the requests as well as use that information to potentially the appropriate execution environment configured as needed.
6. Sending User Validation Reports to the Control System.
7. Responding to Information Requests from the Control System.
8. Processing the Event (eg. collecting User Input, displaying the appropriate application to the user)
9. Terminate the Event as commanded (eg. clean-up processes, memory, bounce the Device User out of the system).
10. Report unsupported features, failures, errors, and suspicious behavior to the Control System.
11. Periodically report Status messages to the Control System.

User Operating Units 4*a*

While the input system can also be configured to include user operating input, in a preferred embodiment, a separate independent unit can be used to receive unit operating input, and in such an embodiment the following are implemented.
1) These Processing Units run the software that controls the User System.
2) They do not execute input brought in from Device User, they only present the input interface, the security interface and analyze and compare the diagnostic and forensic data of the input.
3) Only these Processing Units communicate directly with the Device User.
4) They interface with all the Operational and Execution Processing Units within the Device, as well as the Unified User Interface and the Security Terminal. They do not communicate directly with the Input processing Units, Input Events will be executed on the Execution Processing Unit, and then send to the appropriate Input Processing Unit.

User Interface 4*b*

Unified User Interface 4*b* is a generic Interface that blends different underlying operating system configuration schemes to give the user a consistent look and feel.
1) Due to the device being very dynamic at the lower levels, many underlying configuration schemes are running at the same time all with different underlying configuration options. The Unified User Interface will provide an abstracted way for the user to change the system as needed, without being cumbersome to the user. Simple to understand configuration and Security Profiles will be provided. The Unified User Interface will translate these profiles into the specific operating system commands needed to insure consistency.
2) The Unified User Interface will check to make sure that configuration changes do not affect the current Assurance Scores.
3) The Unified Interface also asks the user questions such as "What would you like to do?", "How long do you expect that task to take?", "When is this task due?", "Have you done this task before?", "Is this something new?", "Do you think you will need help?", etc. These Questions have to keep User Acceptance in mind and will strike a balance between Usability and configuration overload.
4) The Unified Interface does not just pick default applications, rather the Unified Interface asks the question what they are trying to do so that it can setup the best and most protected environment for the user. Known good/safe/accepted applications will be stored in the Reference Database.

5) The Unified Interface will use standard input mechanisms (keyboard, mouse, touch screen) and will support the latest biometric security authentication mechanisms.

6) Communication to the System will be done through the Multi-Channel Communications mechanism. All access to the System will be through the Operational Processing Units, no direct access to system databases will be allowed.

Security Terminal 4c

1) The Security Terminal 4b is the main communications method for posting errors/alarms and security information. It's the main interface used by the Security Operator to provide things like override permissions of warnings as appropriate.

2) The Security Terminal will use standard input mechanisms (keyboard, mouse, touch screen) and will support the latest biometric security authentication mechanisms.

3) Communication to the System will be done through the Multi-Channel Communications mechanism. All access to the System will be through the Operational Processing Units, no direct access to system databases will be allowed.

Device Components

Figure 10:
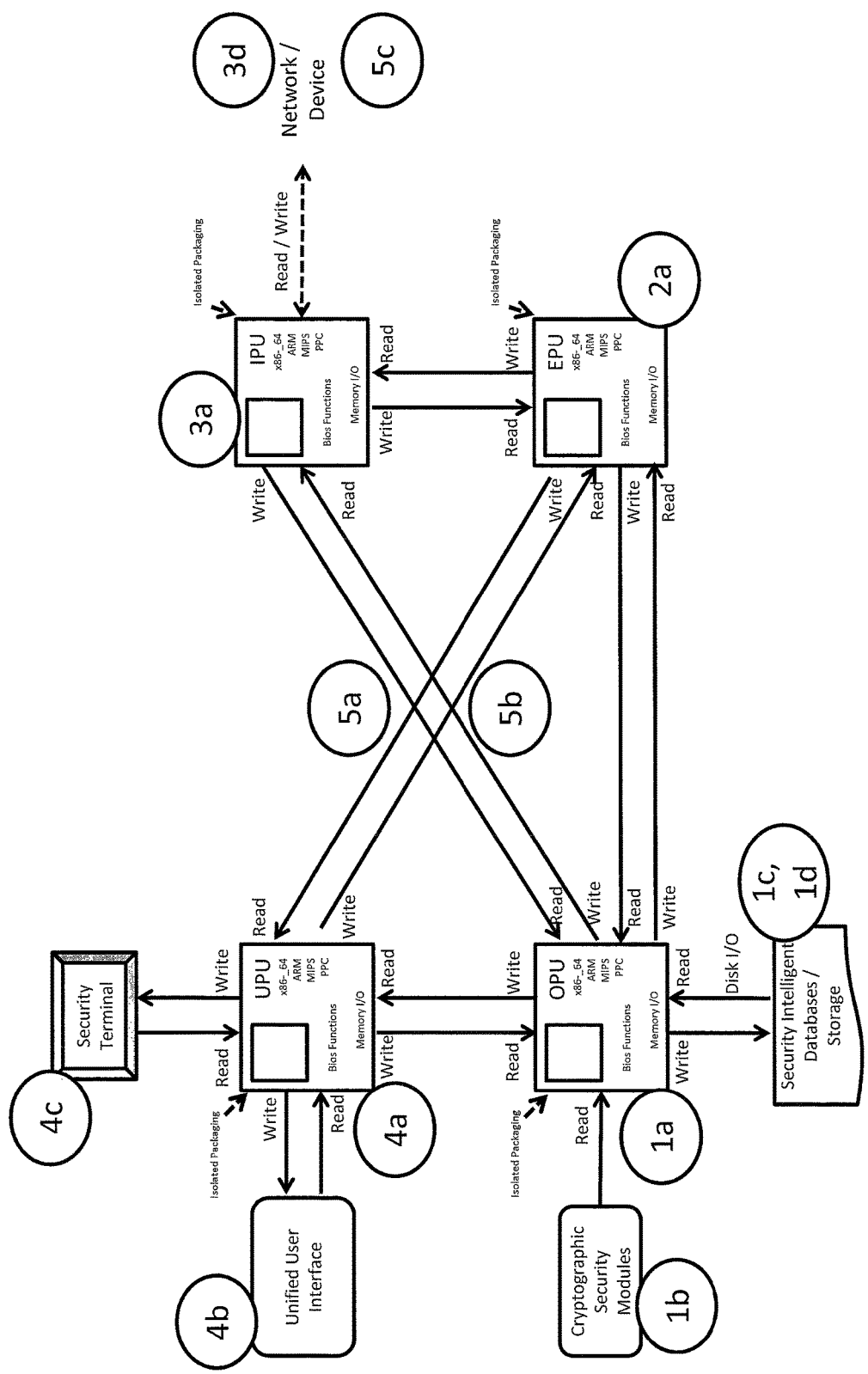
FIG. 10 illustrates a communication system according to embodiments.

The overall Device hardware Architecture is illustrated in FIG. 10. Time synchronized across compute system architecture guarantees from differing systems are consistent for accounting, logging and auditing purposes.

Device Multi-Channel Communication

As shown in FIG. 10, each Processing Unit will have separate read/write channels for inter-Processing Unit communications. The Operational Processing Unit will have will read from the Hardware Security Module for its Crypto Functions, have separate read/write channels for Disk Input/Output, Unified User Interface input and Security Terminal communications.

Channels will be highly secure employing the latest technologies. In a preferred embodiment, Optical-Electrical connections can be used for internal messaging on the multi-channel communication bus, which optical signals can be easily hashed (or not), as discussed previously. Of course, and all-electrical signal system with the hashes, or no hashes, can also be implemented a. The Device is made up of multiple independent hardware and software modules. Each module may contain processors, memory and components that allow for multiple communication paths to be established. The multiple communication paths can be run over electrical wires, short range RF, WIFI, fiber or another medium.

Figure 11:
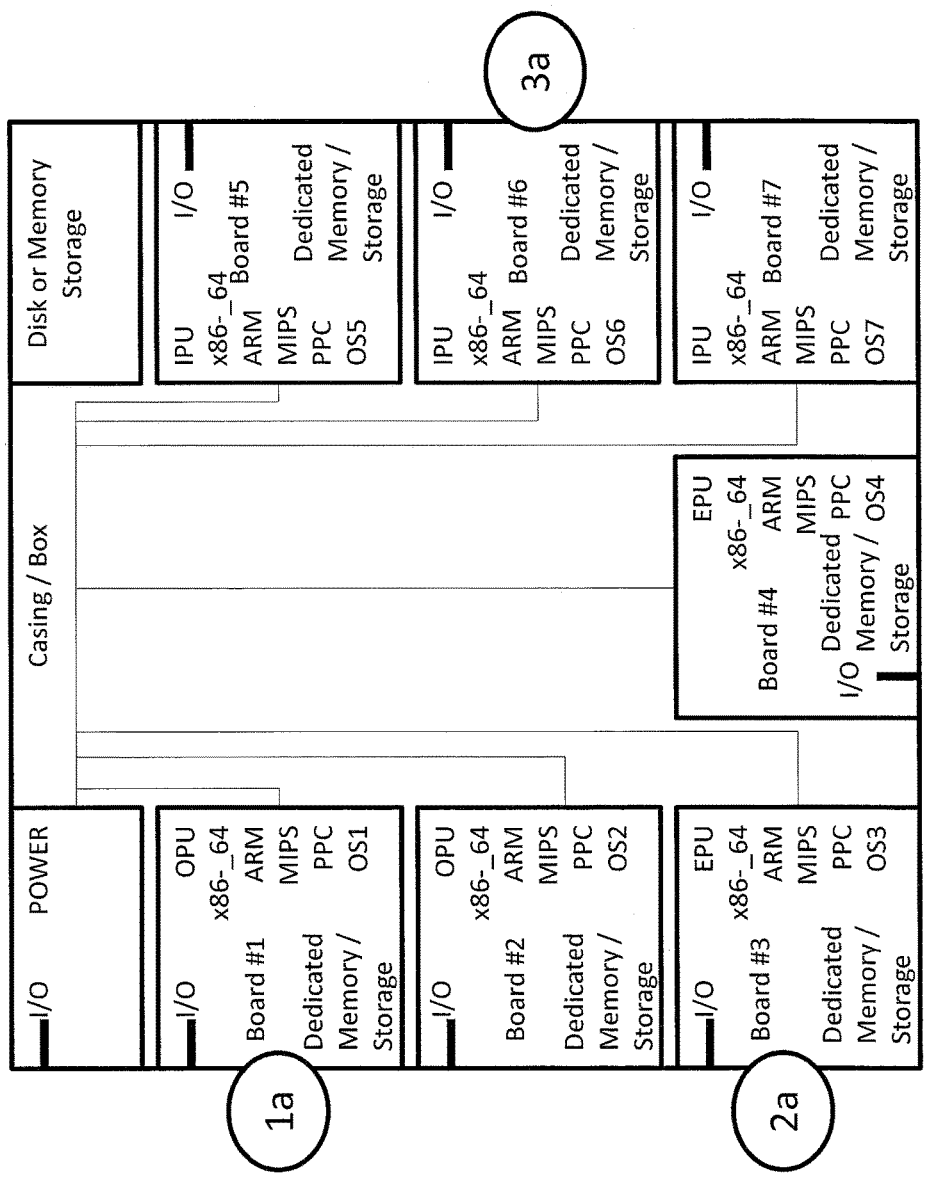
FIG. 11 illustrates a device according to embodiments.

An embodiment in which each of the systems 1, 2 and 3, and in particular the modules 1a, 2a, and 3a are on physically separated cards, which are inserted into a casing/box that also has associated with it a power supply and other standard components, is illustrated in FIG. 11.

Control System Process Flow

Figure 12:
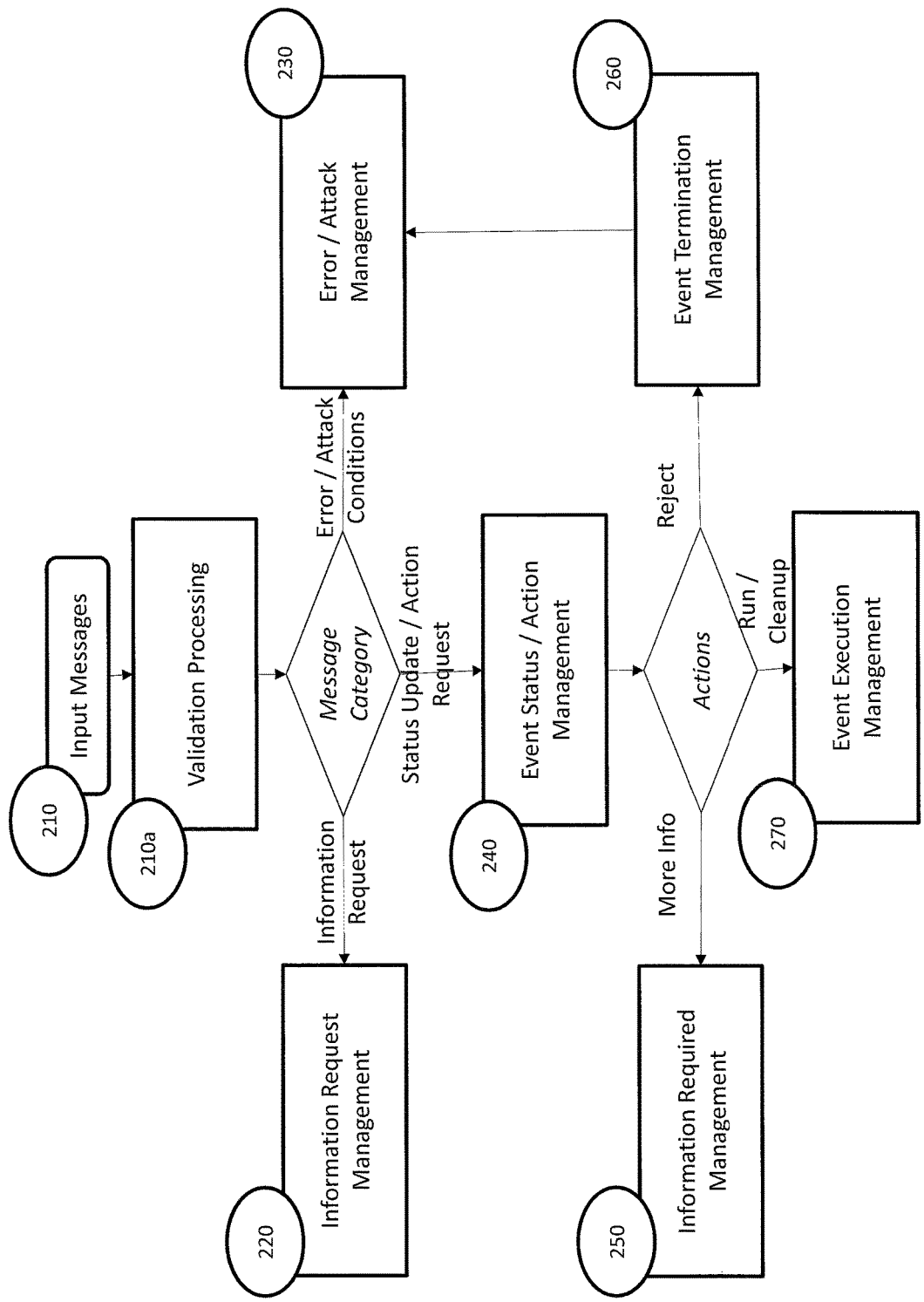
FIG. 12 illustrates a control system flow diagram according to embodiments.

The general flow 200 for the Control System is shown in FIG. 12.

1. Input Messages 210

The Control System receives messages from all other System on the device. The messages are put into the following general categories:

1) Information Requests

2) Error/Attack Conditions

3) Event Status Updates/Action Requests a. Validation Processing 210A

Every System as its first step will validate the message received to ensure that the other systems have not been compromised.

2. Information Request Management 220

The Control System is the only System that has direct access to the databases, so all other Systems will have to send Information Requests to the Control System to obtain the necessary information in the databases.

The Control System will evaluate the request gather the necessary information, and respond appropriately.

3. Error/Attack Management 230

Throughout the Device each System will have some level of evaluation of actions requested by the user, the network, or other System. The Control System is the only System with a holistic view of all events happening on the device. In such cases where another System other than the Control System detects Errors or Potential Attacks, it will inform the Control System so that it can compare the problem with other events happening on the device.

There are three general categories of Error/Attacks:

a. Component Heartbeat failure.

b. Unsupported feature detected.

c. Attack detected

Components will periodically send status (heartbeat) updates, if the heartbeat updates are missed, the Control System will take action to reset/reload that particular failed component. It will also take necessary actions to restart/relocate events in process on that component. It will take care to make sure that the component is just not busy doing "normal" work before declaring it a failure, a high-priority message will be sent as a last resort before declaring the component failed.

Because of the inherent nature of the device, there are features that will be supported on some components, but not others. In order to constantly change the attack surface, there will be times when a component is asked to take action on an event that it does not support. In this case, the component simply reply's with an unsupported message and the Control System takes appropriate actions to relocate the event to another component.

During an Attack, the Control System will take appropriate actions to quarantine the attack. The quarantine may simply be to terminate the attack or there may be an attempt to isolate and spoof the attack. In this case, the attack is isolated as not to affect the System integrity. The isolation may be hardware or software depending on the nature of the attack and available resources, it may be networked or not, again depending on the nature of the attack and available resources.

In all cases, one goal will be to collect as much information about the error or attack for future forensic evaluation.

4. Event Status/Action Management 240

Under normal event processing the Control System will simply be responding to Status Updates as well as event Action Requests.

Status Updates consist of either responses to Control System commands or periodic updates from system components. The periodic updates will either be heartbeat type of messages with component health information or information updates that will be stored in one or more of the system databases.

Action Requests can come from any other Device System. These will generally be event requests from the actual device user (eg. opening applications, using an internet browser, installing new software) or network (eg. responses from web servers, connection requests).

One general principle associated with all event Action Requests will be the Assurance Score of the event itself. The Control System will keep track of past/well known events and their outcomes to determine an Assurance Score of that particular event. The Assurance Score will be maintained per System, where the Control System will keep the overall Assurance Score (ie. The User, Input, and Execution Systems will have their view of the risk of a particular event, the Controls System will do its own evaluation and correlate each into a total Assurance Score). In particular, new events that have never been seen will be treated with a higher degree of caution.

The Assurance Score is a value (0-100) that takes account the level of risk executing a particular event has. A score of 100 is the most safe. It takes into account, known vulnerabilities in particular Operating System/Application versions, load of the component where it will execute, criticality of the other events already running on the component, the particular Device Architecture (eg. how many Processing Units are installed and running), is the event signed/known. There will be default scores defined, but they will be user configurable.

General information contained within the messages is as follows:
- a. Information from the Input System:
  - i. Category, Type, Recommendations, Forensics Info, Assurance Score, Input Data
    1. Category as defined above in the Input Messages section (eg. Information Request, etc.)
    2. Type (eg. https, file mount, etc.)
    3. Recommendations
       a. Recommended mode
       i. Isolated/Networked or not
       ii. Normal Execution
    4. Assurance Score (0-100)
    5. Input Data, actual event data.
- b. Information from the Execution System:
  - i. Execution complete/statistics when done.
- c. Information from the User System:
  - i. Configuration Update/View Requests.
  - ii. User Logged on/off/statistics when done
  - iii. Recommendations
  - iv. Assurance Score
- d. Status Updates from each component.
  - i. General for each:
    1. Load on the component.
    2. Available resources.
    3. Current internal communication setup.
    4. Current running configurations and applications.
  - ii. From the Input System:
    1. Current connected devices and their status
    2. Statistics (eg. events processed)
  - iii. From the User System:
    1. Current users logged on and their credentials, time logged on, current activity.
    2. Current Warnings/Alarms raised.
    3. Statistics (eg. number of Warnings/Alarms raised)

The general steps taken by the Controls System are as follows:
- a. Perform an independent analysis of Updates and Requests. This will include detecting abnormal or risky behavior (eg. too many outgoing/incoming connections, copying large amounts of data, trying to access sensitive data, known issues, known vulnerabilities)
- b. Check the current component inventory for the ability to execute the request.
  - I. If the inventory does not exist (note: this is not running configuration, this is only physical available components)
- c. (Re)calculate the overall event Assurance Score
- d. Determine recommended actions/execution mode based on the following:
  - i. Current Assurance Score vs Allowable configured Score range.
  - ii. Recommendations from other Systems 5. Information Required Management 250

In many cases, the Control System will send requests to other Systems for additional information/actions to be performed. The corresponding System will then execute the request and send a Status Update. Note, the corresponding System will also perform a cross-check on the requests its getting to make sure the Control System has not been compromised.

6. Event Termination Management 260

Under error/attack conditions or when the Control System deems the event too risky (either by known issues or by configuration), the Control System will need to terminate and cleanup the event session. It will perform the following general steps:
- a. Collect Advanced Forensics and Quarantine the Event.
  - i. Command the Input System to send traffic to a packet sniffer for forensic evaluation if appropriate.
  - ii. Command the User System to collect the keystrokes.
  - iii. Interrogate/Inform other devices of the attack. This could mean requesting other devices to remotely turn off the attack if possible.
  - iv. Quarantine the attack (isolate and potentially spoof the attack)
- b. Turn on advanced Logging as appropriate.
- c. Raise any related Warnings and Alarms.

7. Event Execution Management 270

There are three execution Modes:
- a. Normal Execution Mode
- b. Isolated (Networked or Non-networked) Mode
- c. Cleanup Mode Under Normal Execution Mode, the Control System will pass the event on to an Execution Processing Unit to run the event. There will be a Communication Triangle setup between an Execution Processing Unit, an Input Processing Unit and an Operational Processing Unit. The three will own the Event Session either until the event is complete, the Control System deems a configuration change is necessary, or error occurs.

Under Isolated Mode, the Control System will again setup a Communication Triangle between the Input, Execution, and Operational Processing Units. However, the event will be executed in isolation (ie. No access to system resources, only spoofed (fake) access). This mode will be either networked or not depending on the requirements. In some cases in order to spoof certain types of attacks, communication to the network will be required. In these cases, the isolation will be networked in order to collect advanced information/forensics on the event.

Isolated Mode may be done in response to known vulnerabilities/attacks or it may be done as precaution. If done for known attacks, the goal will be to collect advanced forensics to eventually determine the root case of the attack. If done as a precaution, the Control System will evaluate the actions done and either terminate the event or allow the event to run in Normal Mode.

Cleanup Mode, is simply that, when Event Sessions are complete, all system resources will need to be freed. Statistics on the Event Session will also be collected and stored.

1.1 Control System Security Scheduler Details

The Control System Uses a Security Scheduler, which is an advanced Operating System Scheduler for this particular Device. It's generally responsible for maintaining the low level details of each Processing Unit (running configuration, running communications, running processes, load, available resources).

The Security Schedulers general responsibilities are:

1. Keep track of hardware/software components in the system, their configuration, and the state (load, what is running, its priority, and its criticality).
    a. Maintains component (eg. hardware/operating system/applications) configuration (current Ingredients loaded).
    b. Maintains current running state of components in the system
        i. System loads, what is running along with its priority.
2. Configures system components as required to run request. Will setup the Mode of Execution: Normal or Isolated.
3. Sets up randomized multi-channel communications between the Input, Execution, and Operational Processing Units.
    a. The Input and Execution Processing Units will work together to run the Event Session.
    b. The Operational Processing Unit will monitor the progress of the execution, log as appropriate, and act on any suspect behavior.
    c. Communication channels are multi-channel and randomized such that the path of any specific request/task cannot be predetermined externally and will change from session to session or can periodically change during a session.

Control System Security Scheduler Process Flow

Figure 13:
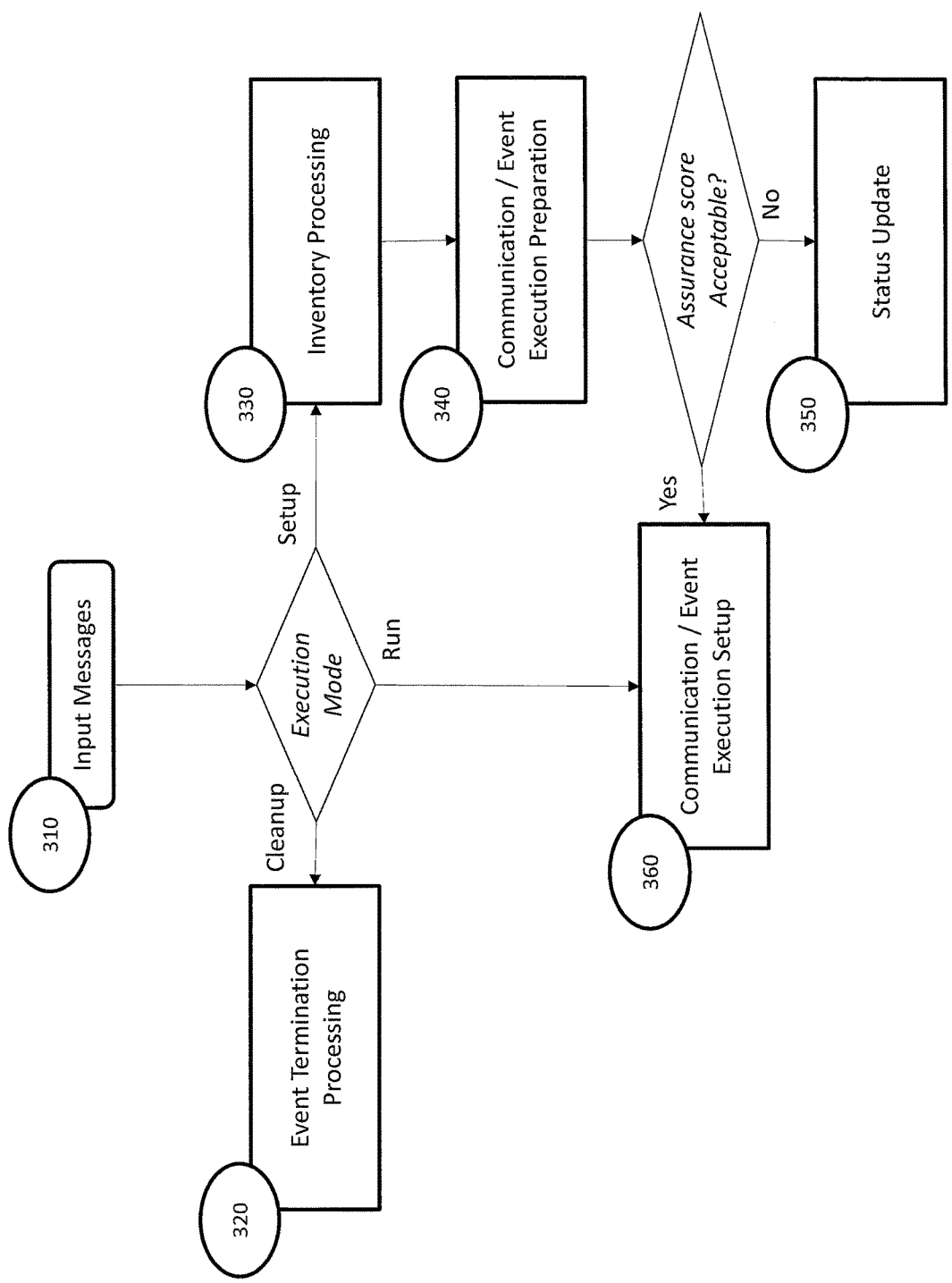
FIG. 13 illustrates an input system flow diagram according to embodiments.

The general flow 300 for the Security Scheduler is shown in FIG. 13.

1. Input Messages 310
The basic information received is what Mode and what configuration is required:
    a. Execution Mode (Normal, Isolated, or Terminate)
    b. Required event configuration, including hardware/software and environment requirements.
    c. Priority
    d. Logging Mode (normal/verbose)
2. Event Termination Processing 320
When an Event Session is completed, this may be termination of a session running in Normal Mode or in Isolation Mode, the following will occur:
    a. Kill associated applications/processes.
    b. Validate resources are properly freed
    c. Log actions and the current state (normal or verbose)
3. Inventory Processing 330
If the Event is to run, either in Normal or Isolated Mode, the Security Scheduler needs to compare the running hardware/software inventory (ingredients) vs. the required configuration (configuration needed to execute the requested task).
If required Ingredients are not currently running, the Security Scheduler will either start/install the required Ingredients or queue them up.
In the event that events are taking too long to run, the Security Scheduler will inform the Control System, either other events will need to be cleaned up by the user or the request needs to be rejected.
4. Communication/Event Execution Preparation 340
In preparation for the Event Execution, the Communications Triangle (communication between the Input, Execution, and Operational Processing Units) needs to be setup. In keeping with the ever-changing attack surface principle, the communication channels and the Processing Units will all be chosen at Random between those that can support the request.
The Security Scheduler will perform the following actions:
    a. Pick a random available Execution Processing Unit for running the Event.
    b. Pick a random available Operational Processing Unit for monitoring activity and logging as appropriate.
    c. Pick a random available Input Processing Unit to pass the event to the Execution Processing Unit.
    d. Create random communication channels between the Input Processing Unit, the Execution Processing Unit and the Operational Processing Unit.
    e. Update Assurance Score as appropriate, the following considerations will affect the Assurance Score:
        i. Of the randomly selected Processing Units to run:
            1. Is there enough resources to add this in?
            2. What is the system load after adding this in?
            3. What is the criticality of the other processes already miming how will this affect them?
            4. What Ingredients do I need to bring in to run this input unit?
5. Status Update 350
If after the Processing Units have been chosen, the Assurance Score reduces to an unacceptable level (below the configured value), the Security Scheduler will inform the Control System and wait for further instructions.

6. Communication/Event Execution Setup 360
Once its been determined that event till be executed in either Normal or Isolated Mode, the Security Scheduler will setup the previously determined communication triangle.
  a. Setup the Communication Triangle (The Communication channels between the Input, Execution, and Operational Processing Units).
  b. The Communication Triangle will configure the Security Device Driver
    i. The Security Device Driver is a process that relates relevant communication channel state information. The Security Device Driver will dynamically map hardware devices/channels for the system. All channels are mapped in memory based on the configuration provided by the Security Scheduler. The controlling Input, Execution, and Operational Processing Units will use the Security Device Driver to know what channels to communicate on for specific tasks.
  c. Setup Appropriate Execution Mode
    i. Isolation Mode
      1. Execution is determined to be of high risk, the event will run in isolation, either networked or non-networked. In both cases, the event will have no real access to system databases or system resources. For cases where we need to spoof the network, the Isolated Mode will have access through the Input System.
      2. Ideally Isolation Mode will mean "Hardware Isolation" which is defined as an independent hardware module, running only that assigned task. This ensures that running anything that is risky will not bring down other modules in a system.
  d. Launch appropriate applications for execution on the Execution Processing Unit.
  e. Setup appropriate logging of activity on the Operational Processing Unit.

Figure 14:
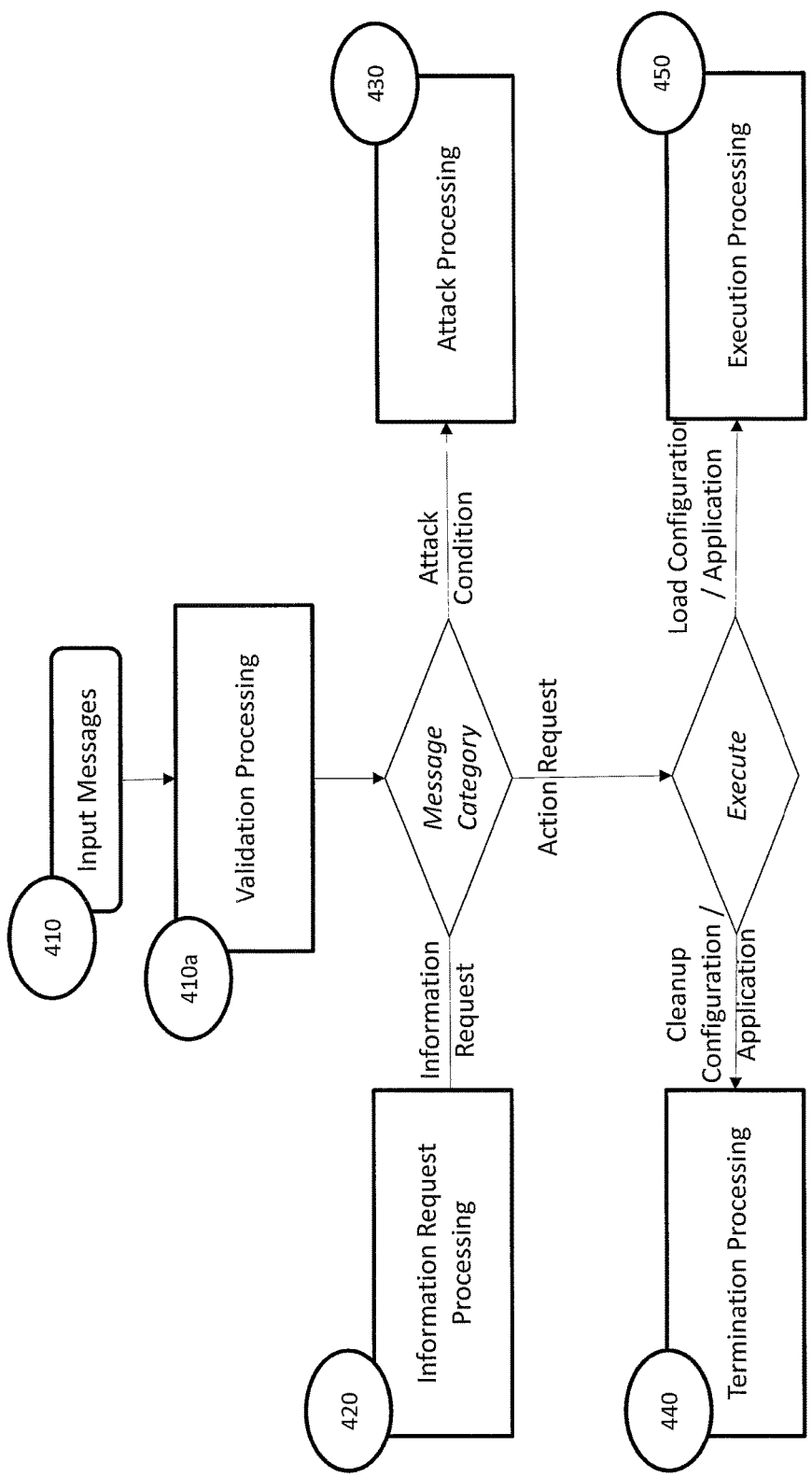
FIG. 14 illustrates an execution system flow diagram according to embodiments.

1.2 Execution System Process Flow
The general flow 400 for the Execution System is shown in FIG. 14.
  1. Input Messages 410
  The Execution System will receive messages from the Control System. The messages are put into the following general categories:
    1) Information Requests
    2) Error/Attack Conditions
    3) Action Requests
    a. Validation Processing 410A
      Every System as its first step will validate the message received to ensure that the other systems have not been compromised.
  2. Information Request Processing 420
  The Control System may request status of particular Event Sessions.
  3. Attack Processing 430
  An Attack may have been detected, in this case the Control System will tell the Execution System to take steps to Quarantine the Event and its associated applications to limit the damage. This may mean isolating the particular Event and collecting advanced logging and Forensics. It may simply mean to terminate the application.
  4. Termination Processing 440
  When an Event or Event Session is stopped normally, the Control System will inform the Execution System to clean up. This would generally happen when the Device User terminates an application.
  5. Execution Processing 450
  The Control System will inform the Execution System to load particular configurations, device drivers, and applications. There are two modes of execution: Normal and Isolated. Under Normal Mode the Event will be allowed to access anything it has permission to. Under Isolated Mode, the Event will not be allowed to access any real information. The Isolated Mode will either run networked or non-networked. In networked isolation, the Event will be able to send messages to the Input System as normal. The Input System will be informed by the Control System, that this particular Event is running in Isolation. If the Event is running in non-networked, the Execution System will not allow any messages to go to the Input System.

Figure 15:
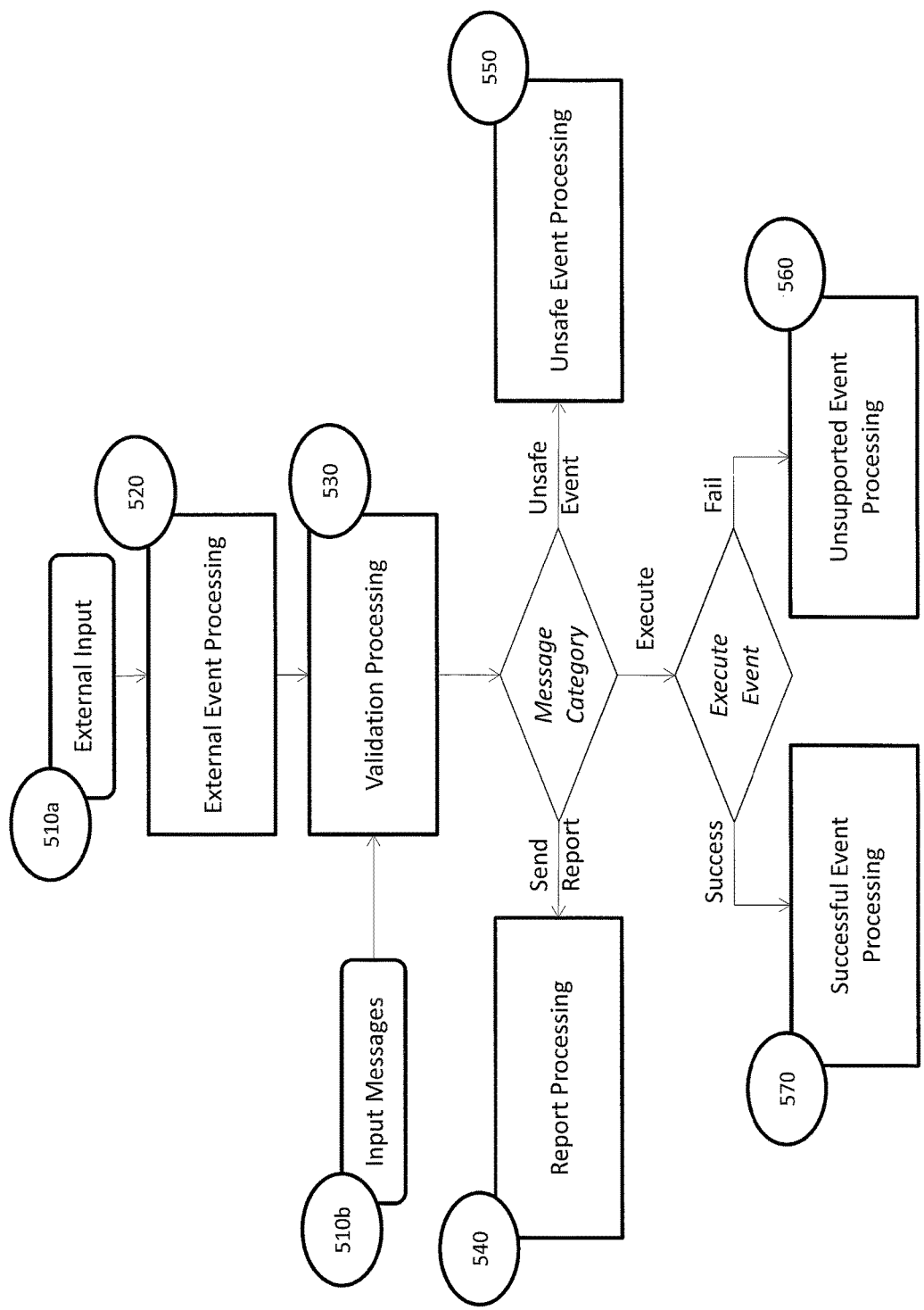
FIG. 15 illustrates a input system flow diagram according to embodiments.

1.3 Input System Process Flow
The general flow for the Input System is shown in FIG. 15.
  1. Input 510A
  a. External Input 510A
    External Input will be delivered by standard or customized hardware from the following sources:
      i. Network/Ethernet/BLUETOOTH (eg. www)
      ii. External device connections (eg USB, Camera)
      iii. Internal CP Manager responses and queries
      iv. External Security Protocol via internet.
  b. Input Messages 510B
    The Input System will receive internal messages from the Control System.
      i. The Control System will either request information or it will command the Input System to either execute the Input Event, execute a user Event, provide more information, terminate an Event, or Quarantine an Event.
  2. External Event Processing 520
  a. Messages/Events coming externally, including External Security Protocol, will be multicast to all Input Validation Engines for processing. Only the predetermined Controlling Input Processing Unit, will initially act on the Input.
  3. Validation Processing 530
  Event Sessions are generally initiated by the Device User or the Network. User initiated Events would include things like launching a web browser or plugging in a USB. Network initiated Events would include things like a BLUETOOTH or Internet connection request. Validation Processing's job is to evaluate what its received and determine next steps.
  For the initial External Input, it performs checks and reports the Event, its analysis, and its recommendations to the Control System for further processing. In some cases, the entire input data will be sent, in other cases, only the Event type will be sent. This may also include requesting specific information about an Event from the Control System. It will then wait for the Control Systems response/analysis before proceeding. There may be low level checks that determine that the External Input is a known threat, in which case, the Input System can determine the Event is unsafe and initiate Quarantine actions directly.
  For User initiated Events, the User System and Control System will have already done validation of the request, however, the Input System will still further cross check the request incase the User System or Control System has been compromised.

For all Events, the Input System will calculate an Assurance Score. The Assurance Score always reported to the Control System for storage in the Reference Database. Retrieval of known Assurance Scores will be requested from the Control System.

For every Event received, either externally or internally, there will be a predetermined random Controlling Input Processing Unit that takes control and does the validation. This determination is done by the Control System and is completely randomly chosen from the available Input Processing Units. The randomness is so that the attack surface is constantly changing.

Each action taken on the Event will be logged through the Control System.

Some specific Validation that's done is as follows:
  a. Source information, including IP, machine name, userid/location
  b. Input unit information, such as type of file or message
  c. Check for valid signatures 4. Input Report Processing 540

Under normal processing, once the initial Input Event has been validated for the first time, the Input System will report its findings to the Control System. There are instances when the Input System will need further information about a particular event before it can complete its Validation. In such instances, the Input System will report its findings to the Controls System along with the requested information. The Control System will then either simply send the requested information to the Input System and wait for further Validation reports, or will have enough information itself to determine if the Event should be processed or deemed unsafe.

5. Unsafe Event Processing 550

Based on both the Input Systems evaluation and/or the Control Systems evaluation an Input Event may be deemed unsafe/not secure enough to continue processing. This may be from known vulnerabilities, abnormal behavior, or not meeting the configured level of Assurance. In such cases, the Input System will work with the Control System to perform actions such as:
  a. Copy contents into lock box
  b. Record userid/location
  c. Redirect packets to network sniffer
  d. Take file system offline/mark them as corrupt
  e. Drop the request 6. Unsupported Event Processing 560

Because of the random nature of which Input Processing Unit is in control of a particular Event, there may be instances where the Controlling Input Processing Unit cannot process the Event because it does not support that particular Event. In such cases, the Input System simply reports this back to the Control System and new Input Processing Unit is selected. If all Input Processing Units do not support the event, it will be reported back to the Device User or Security Operator depending on the action. If appropriate, the unsupported event will be marked "offline" (in the case of an unsupported file system) or dropped.

In some cases, it may be the fact that the appropriate device driver is not installed on one particular Input Processing Unit. In such cases, the Control System will instruct the Security Scheduler to install the driver on that particular Input Processing Unit.

7. Successful Event Processing 570

In the cases where the event/request is deemed safe and is successfully processed by the Input Processing Unit, control for further processing will be passed to the Control System for next steps. Those next steps may include setting up the Communication Triangle with a particular Execution Processing Unit to execute the Event.

1.4 User System Process Flow

Figure 16:
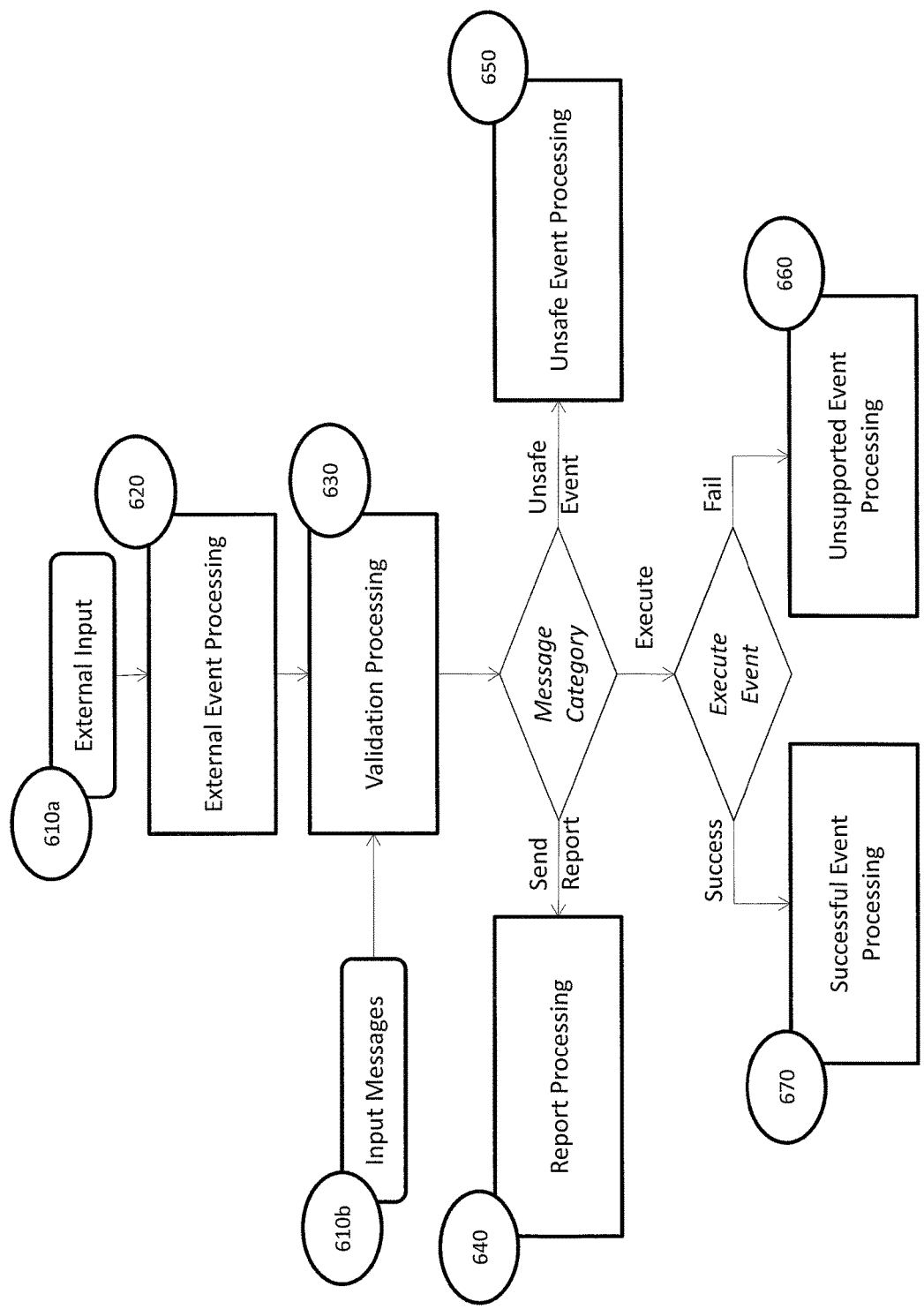
FIG. 16 illustrates a user system flow diagram according to embodiments.

The general flow for the User System is shown in FIG. 16:

The user system processing, shown as 610*a* through 660, generally corresponds to that of the Input System processing described immediately above with respect to FIGS. 15 and 510 through 560. That notwithstanding, the following provides a further elaboration of the User System:

External Input 610*a*

External Input will be delivered by standard or customized hardware from the following sources:
  i. Keyboard (via "WINDOWS" type of interface)
  ii. Screen Share (via remote control)
  iii. Terminal Interface (via "Xterm" type of interface)
  iv. Security Terminal Interface Input Messages 610*b*

The User System will receive internal messages from the Control System.
  a. The Control System will either request information or it will command the User System to either execute an Event, provide more information, terminate an Event, or Quarantine an Event.

External Event Processing 620

The User System will scrape the screen input and convert into a parse-able format. It will also receive data entered from a normal terminal interface or security terminal interface.

Validation Processing 630

Under normal login procedures, the first thing that is requested from the user is their credentials. These credentials will be validated with help of the Control System.

The controlling User Processing Unit will then verify the user input, scanning it for embedded attacks (eg. embedded url/web redirects (XSS attack), input length, special characters).

For the cases where commands are received via a normal terminal or security terminal interface, additional checks will be done (eg. if sensitive data is being processed, large amounts of data is being deleted/copied, network connections requested).

Report Processing 640

Under normal processing, once the initial Input Event has been validated for the first time, the User System will report its findings to the Control System. There are instances when the User System will need further information about a particular event before it can complete its Validation. In such instances, the User System will report its findings to the Controls System along with the requested information. The Control System will then either simply send the requested information to the Input System and wait for further Validation reports, or will have enough information itself to determine if the Event should be processed or deemed unsafe.

Unsafe Event Processing 650

Based on both the User Systems evaluation and/or the Control Systems evaluation an Input Event may be deemed unsafe/not secure enough to continue processing. This may be from known vulnerabilities, abnormal behavior, or not meeting the configured level of Assurance. In such cases, the Input System will work with the Control System to perform actions such as:
   a. Terminate the Device User session.
   b. Quarantine/Spoof the Device User.
   c. Record all user input along with user information.

Unsupported Event Processing 660

Because of the random nature of which User Processing Unit will be controlling at any particular time, there will be times when the controlling User Processing Unit will be asked to perform actions that it is not setup to be supported. In this case, the User Processing Unit will simply report this to the Control System. The Control System will either install the appropriate software or will redirect the control to another User Processing Unit.

Successful Event Processing 670

In the cases where the event/request is deemed safe and is successfully processed by the User Processing Unit, control for further processing will be passed to the Control System for next steps. Those next steps may include setting up communications with a particular Execution Processing Unit to execute the Event.

1.5 Multi-Channel Communication

Multi-channel communications are implemented to provide an additional layer of internal security, and are shown in FIG. 1 as the multi-channel internal communication bus 5, or simply the Communication System 5. Characteristics of the multi-channel internal communication bus 5 include:
   1. Multi-Channel Communications
      a. Channels will be multi-channel to increase randomness of communications
   2. Input System, network access
      a. Input System will have access to network connections
   3. Execution System, network access
      a. The Execution System may have access to network connections. If something is running in Isolated Mode, no network access will be allowed. Networked Isolated Mode will have limited network functionality, network access is granted only to spoof potential network attacks for additional forensic gathering.
   4. Control System, network access
      a. The Control System will nave no network access to limit network vulnerabilities. The Control Plane runs in isolation to prevent it from attack.

Figure 17:
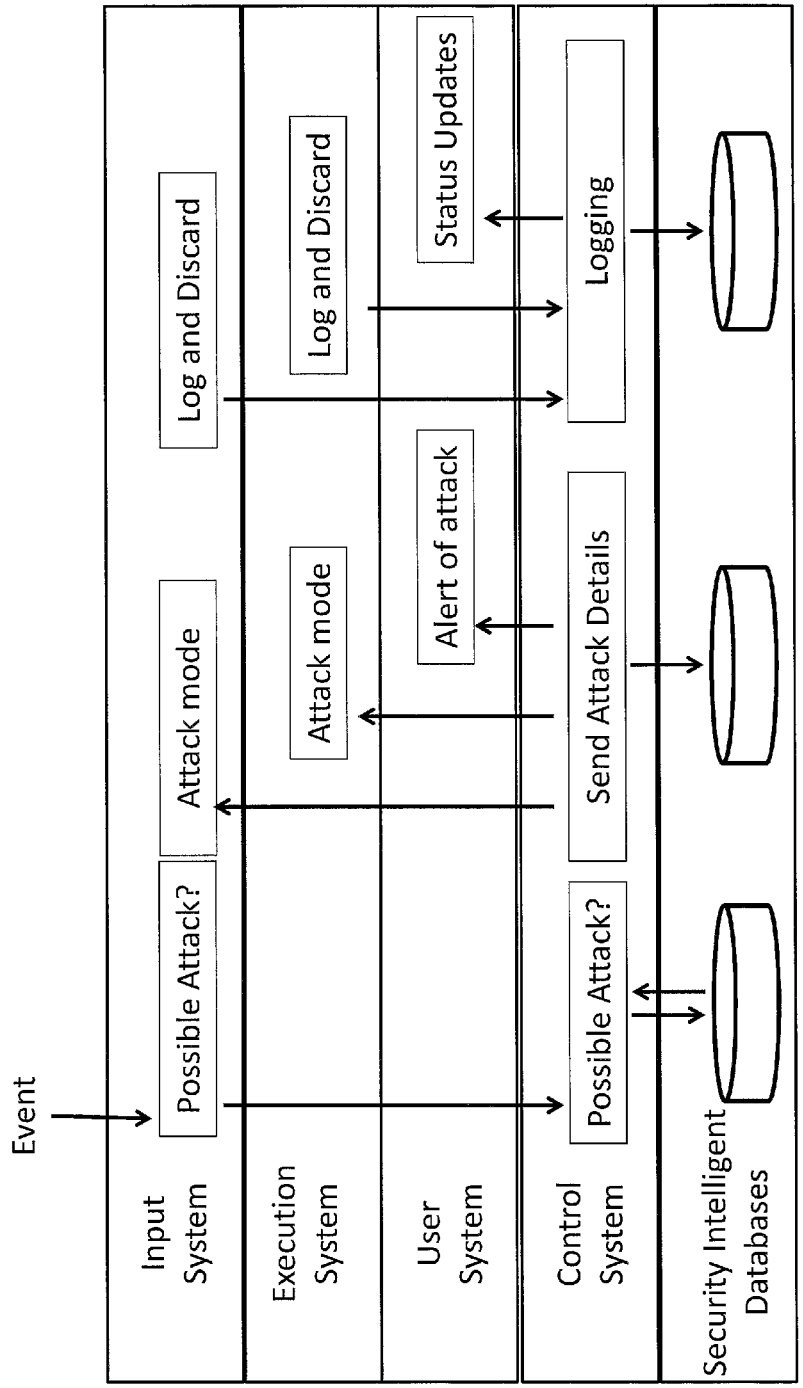
FIG. 17 illustrates detecting a server DoSa attack according to embodiments.
Figure 18:
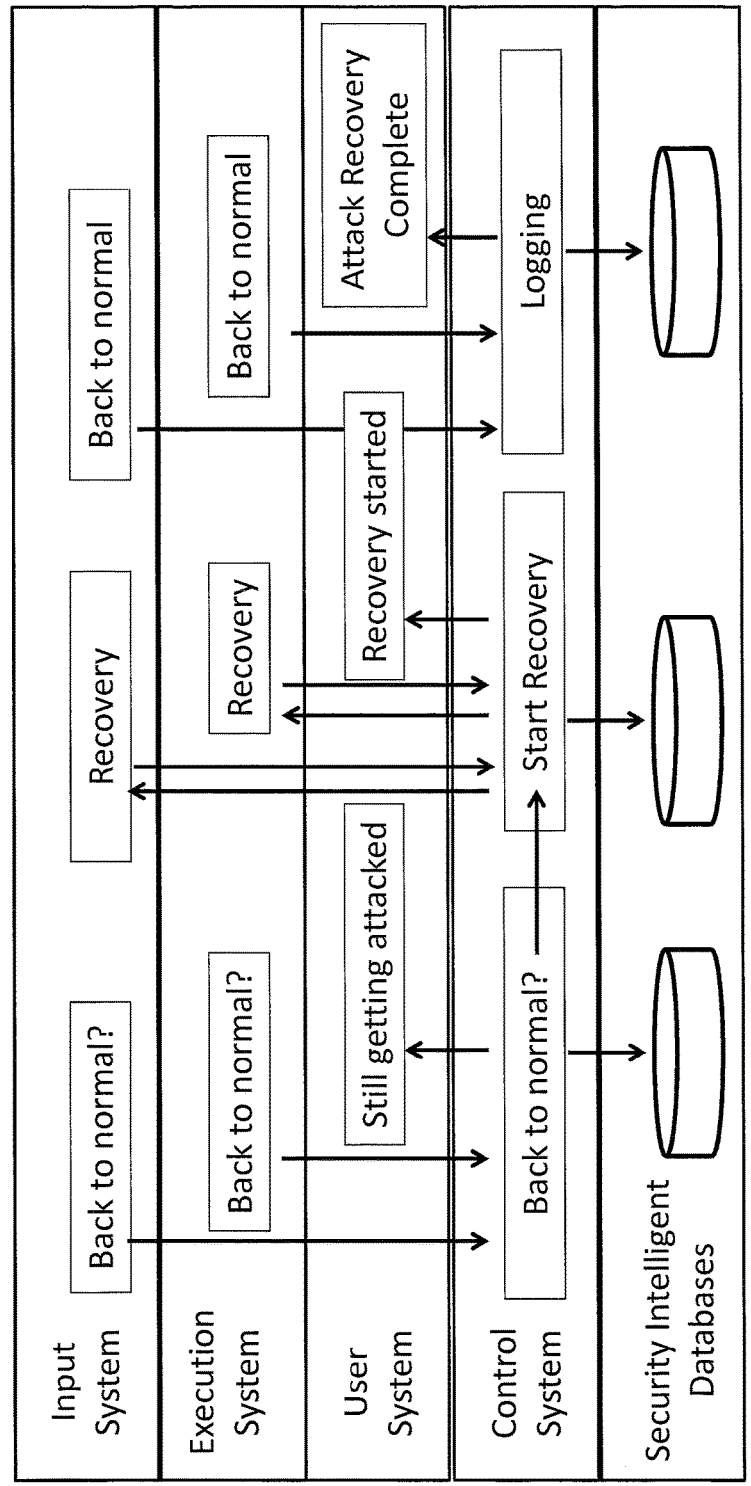
FIG. 18 illustrates ending a server DoS attack according to embodiments.
Figure 19:
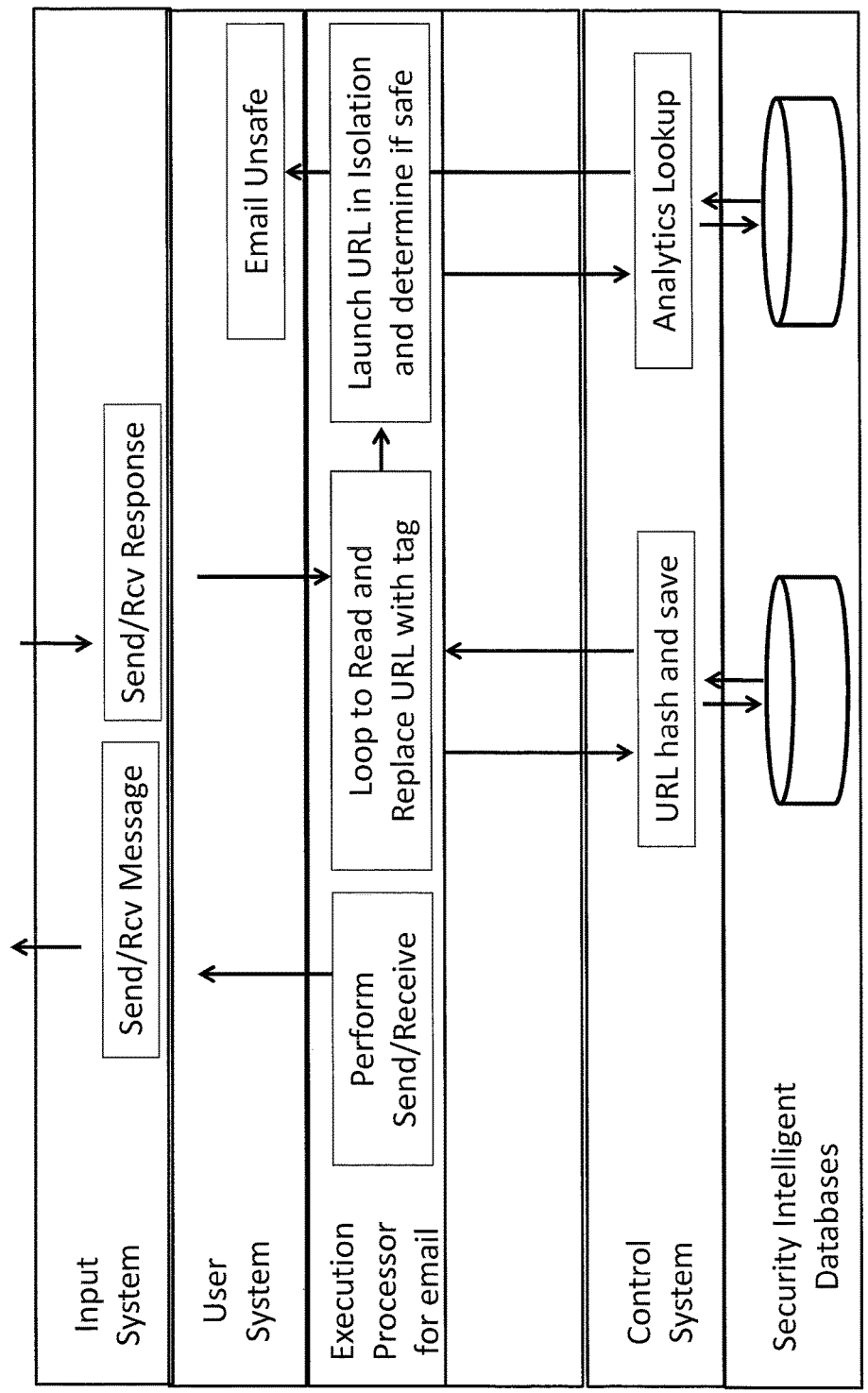
FIG. 19 illustrates email receive and replace URLs according to embodiments.

With the preferred embodiments having been described, reference to FIGS. 17-19 will now be provided, that illustrate examples of specific usage cases.

FIG. 17, based upon the above descriptions, the overall sequence and usage of the different components for detecting a server DoS attack.

FIG. 18, based upon the above descriptions, the overall sequence and usage of the different components for ending a server DoS attack.

FIG. 19, based upon the above descriptions, the overall sequence and usage of the different components for email receipt and replacement of unsafe URL's.

In a further embodiment, a register key field is included the header that is added to internal messages, which register key field can be used to include a reference to a specific port, thereby not being required to support the conventional 65,535 open ports that currently are conventionally available, as the typical inputs can go to a table that can then point to as many different ports as one desires to include therein.

Based upon the above embodiments, the following scenarios are implementable based thereon.

Industrial Control Systems—

One area that makes systems insecure is that they are not always patched. For instance, an Industrial Control System. These systems are vulnerable to Cyber attacks because they are systems that people are reluctant to change because of their importance to society. Many of these systems are also legacy systems and not everyone knows how they work so they are also concerned to make changes to them fearing the implications a mistake could entail. Because people are reluctant to upgrade these systems, they run old that still has bugs in it. These bugs can be exploited in Cyber attacks. The DSAE architecture allows upgrades of these systems. The DSAE architecture also stores previous running "safe" and "known" good system configurations. This allows an DSAE System to return to a known, good, safe state should an error occur or bad configuration get loaded. The ability to return to return to a known, good system state is a core tenant of the DSAE architecture. The core security principles of availability and integrity are realized in the DSAE architecture.

The DSAE architecture also protects an Industrial Control System by allowing the system to provide its core purpose by running in an isolated environment from network based Cyber Attacks. The core functions of the Industrial Control System can run in an isolated protected shell of an DSAE system. The DSAE architecture can handle and mitigate a number of different Cyber attacks such as Denial of Service (DOS) or a number of other attacks by never allowing them to reach the core of the Industrial Control System, thus letting the Industrial Control System provide its core functionality.

Another way the DSAE Architecture helps protect Industrial Control Systems is by continually monitoring and detecting Cyber Attacks. The continual monitoring of the Industrial Control System (through the basic functionality of the DSAE architecture) makes it extremely difficult for an attack to occur because the DSAE system is able to alert and adapt to many different attacks to an Industrial Control System.

Third Party Components and Economic Benefits for Nations—

Traditional electronic systems run a core set of processors, operating systems and applications for tasks. This poses a huge security risk in that a fully functional system is only as secure as the least secure component. One vulnerability in one component (hardware, software, architecture or process) can make a whole system insecure. The DSAE architecture mitigates these issues in a number of ways.

The modular DSAE architecture allows components to run in various degrees of isolation. The knowledge databases all keep track of historical system information, contain knowledge about known vulnerabilities along with containing an integrated testing and validation databases. All of this information can be used for the system to make decisions. One of those decisions can be to not run a particular, deemed insecure workload, on a known processor that is known to have a particular vulnerability.

Another scenario is that a workload that needs to run needs to be extremely secure and should not run with components from certain countries. In this instance, the DSAE architecture creates a system configuration dynamically to meet the hardware and software configuration that is needed to run the secure workload. Access to particular resources, such as a microphone, USB devices, etc. can also be restricted if required for extremely secure environments. An DSAE system allows for this by not creating the required hardware channels dynamically required access to the execution environment for highly secure environments. If hardware cannot be accessed, then it cannot be used by a system.

Due to the dynamic nature of an DSAE system which allows for dynamic hardware configurations as needed, bans on some countries from being able to sell into some markets may potentially be relaxed due to certain hardware and software configurations not being used for some of the most secure configurations, which most secure configurations can be restricted, while still allowing for other configurations.

Internet of Everything—

The Internet of Everything is a concept of where all devices are connected to the Internet. It is estimated that up to 50 billion devices will be connected to the Internet by 2020. This causes issues because most companies are not experts in the Internet and networking. Devices that have traditionally not been connected (such as cars, medical devices, household appliances, etc.) to the Internet are now being connected without any regard for security. Companies focus on getting their devices on the Internet which is a task in and of itself, yet they are not aware of the security implications of doing this. The DSAE architecture allows companies to leverage a secure architecture from day one when adding Internet functionality to their devices. The adaptive nature of the DSAE architecture allows it to withstand many different Cyber Attacks through intelligence stored in the DSAE databases and different processors in the DSAE system.

Credentials/Authentication Attacks

Many attacks against a system occur once credentials are compromised. An DSAE architecture system combats these attacks by continually changing system level and database passwords every time a new execution environment is created. An Operational Processing Unit gets a request from some event to create a new execution environment. As part of the environment setup, the OPU talks with the cryptographic modules to get a set of random input that can be used as passwords for the execution environment. The OPU passes a number of passwords into the execution environment via the kernels in the execution system that can only get accessed by the DSAE driver. The driver then configures all system passwords.

Mobile Devices

Mobile devices are extremely vulnerable to Cyber attacks particularly Phishing attacks. The DSAE architecture greatly reduces the Cyber attacks against mobile devices.

Realistically, mobile devices contain two main core set of applications types. The first type of mobile applications are very intensive graphic applications such as games, watching videos, photo editing, etc. Graphic intensive applications for mobile devices predominately leverage the mobile device's compute and graphic processors and local storage.

The second main type of mobile device applications are web applications. These applications are frontend applications to websites. Currently, as of 2015, web applications are some of the most susceptible to Cyber attacks. Phishing based attacks are some of the most destructive of the web attacks against mobile devices. The DSAE architecture protects mobile devices from Phishing attacks through it's hardware isolation properties. By having hardware isolation defenses, the DSAE architecture mitigates Phishing attacks. Hardware isolation and different software configurations mitigates Phishing attacks, which are one of the most dangerous Cyber attacks.

Another Cyber attack scenario that plagues companies is known as Bring Your Own Device (aka BYOD). BYOD means that an employee can use whatever device they feel most comfortable with many times for both their private and business use. The problem this causes organizations is that potential private use of a device for business purposes introduces a host of new Cyber attacks to an organization. The DSAE architecture can help mitigate these issues by allowing both a business and personal configuration on the same physical phone device. The DSAE architecture allows a mobile device to go into both a business and personal mode through the use of multiple hardware and software configurations.

Although described with reference to embodiments, it should be readily apparent to those of ordinary skill in the art that various changes, modifications and substitutes are intended within the form and details thereof, without departing from the intended spirit and scope. Accordingly, it will be appreciated that in numerous instances some features will be employed without a corresponding use of other features. Further, those skilled in the art will understand that variations can be made in the number and arrangement of components illustrated in the above figures.

What is claimed is:

1. A method of providing security to a device, the device including a plurality of input processing modules within an input system, a plurality of control processing modules within a control system, a plurality of execution processing modules within an execution system, and a multi-channel internal communication bus whereby at least one of the plurality of input processing modules, at least one of the plurality of control processing module, and at least one of the plurality of execution processing module are coupled for data and control transmissions therebetween, and wherein the device is adapted to communicate with an external communications network and receive a plurality of external messages over a period of time at the plurality of input processing modules, which plurality of external messages have data portions therein that are used by at least one of a plurality of applications, the method comprising:

configuring the plurality of input processing modules to each present a different attack surface at different intervals within the period of time to the received plurality of external messages from the external communications network, each different attack surface corresponding to a different processor executing a different instruction set and a different operating system;

receiving each of the plurality of external messages from the external communications network only at the plurality of input processing modules and not at the plurality of control processing modules and not at the plurality of execution processing modules;

for each received external message, message processing occurs only after each received external message is validated;

upon validation, transmitting certain data portions of a received message using the multi-channel internal communication bus to one of the plurality of execution processing modules; and executing solely within the one of the plurality of execution processing modules a corresponding one of the plurality of applications using the certain data portions.

2. The method according to claim 1 wherein each different attack surface is presented at different intervals by configuring the plurality of input processing modules within the input system, each which have different hardware therein.

3. The method according to claim 1, including receiving some of the received plurality of external messages at only one of the plurality of input processing modules within the input system, wherein the plurality of input processing modules within the input system has at least one difference from a set of characteristics, the set of characteristics including operating system, library, application and kernel.

4. The method according to claim 1 including using one of a plurality of different read/write channels, which one of the plurality of read/write channels that are independent of the external communications network and also cannot be determined by the external communications network.

5. The method according to claim 4 wherein the one of the plurality of different read/write channels includes encrypting internal messages that are independent of the external communications network.

6. The method according to claim 5 wherein the one of the plurality of different read/write channels includes an electrically isolated transmission medium.

7. The method according to claim 1 wherein, for at least one of the received messages:
transmitting internal control messages between the plurality of input processing modules within the input system and the plurality of control processing modules within the control system using a first communication channel;
signing each of the internal control messages before proceeding with transmission of any data portions of the at least one of the received messages;
transmitting certain data portions of the received message between the input processing modules and the execution processing modules within the execution system using a second communication channel that is different than the first communication channel.

8. The method according to claim 7 wherein transmitting internal control messages also includes using a parallel protocol on the multi-channel internal communication bus.

9. The method according to claim 1 further including:
periodically providing a heartbeat update internal control message to the plurality of control processing modules within the control system from the plurality of input processing modules within the input system and the plurality of execution processing modules within the execution system; and
upon detection of the absence of the heartbeat update internal control message, disallowing any further external message being validated until resolution of the absence of the heartbeat update internal control message.

10. The method according to claim 1 wherein for at least one of the received messages, an unsupported feature is detected and data portions within the at least one received message are not transmitted onto the multi-channel internal communication bus and are not received by either of the plurality of control processing modules within the control system or the plurality of execution processing modules within the execution system, thereby segmenting and isolating the plurality of control processing modules within the control system and the plurality of execution processing modules within the execution system from the received message.

11. The method according to claim 1 wherein for at least one of the received messages, an attack is detected and data portions within the at least one received message are not transmitted onto the multi-channel internal communication bus and are not received by either of the plurality of control processing modules within the control system or the plurality of execution processing modules within the execution system, thereby segmenting and isolating the plurality of control processing modules within the control system and the plurality of execution processing modules within the execution system from the received message.

12. The method according to claim 11 wherein, for the at least one received message, upon detecting the attack, one of the plurality of control processing modules within the control system initiates a termination sequence that collects additional forensics relating to the attack and quarantines the attack.

13. The method according to claim 1 wherein, for at least one of the received messages, the received message is externally transmitted using one of an external device channel, an ethernet channel, or a wireless channel; and depending upon which of the external device channel, the ethernet channel, or the wireless channel is used, a dynamic protocol adapts to ensure that an appropriate one of the plurality of input processing modules within the input system is selected when validating the received message associated therewith.

14. The method according to claim 1, wherein each of the plurality of input processing modules within the input system, the plurality of control processing modules within the control system, and the plurality of execution processing modules within the execution system provide a dynamic protocol; and further including adapting a received message by adding a header thereto, wherein the header includes at least one additional field from a set of additional fields including message type, register key, hash key, priority, ratings, and priority classification.

15. The method according to claim 1 wherein, for at least one received message, one of the plurality of input processing modules within the input system:
detects that a database query is required;
requests a database read to one of the plurality of control processing modules within the control system without transmitting any data portions from the received message; and
receives a database response internal control message from the one of the plurality of control processing modules within the control system responsive thereto.

16. The method according to claim 1 further including at least one cryptographic security module that store cryptographic keys.

17. The method according to claim 1 wherein a particular one of the plurality of input processing modules within the input system is randomly selected to process a particular one of the plurality of external messages.

18. The method according to claim 1 further including randomizing an input/output port using a register key, wherein the register key is maintained within a header of internal messages transmitted on the multi-channel internal communication bus.

19. The method according to claim 18, wherein the register key provides for a port identification that is greater than 65,535.

20. The method according to claim 1, further including receiving each of a plurality of user input messages at a plurality of user input processing modules within the input system and not at the plurality of control processing modules within the control system and not at the plurality of execution processing modules within the execution system.

21. The method according to claim 1, further including determining a risk score for the device, the risk score being determined based upon a plurality of criteria including hardware isolation, periodicity of the attack surface changing, and applications and operating systems currently being used within the device.

22. The method according to claim 1 wherein each different attack surface is presented at different intervals by configuring the plurality of control processing modules within the control system, each which have different hardware therein.

23. The method according to claim 22, including receiving some of the received plurality of external messages at the plurality of control processing modules within the control system, wherein the plurality of control processing modules within the control system has at least one difference from a set of characteristics, the set of characteristics including operating system, library, application and kernel.

24. The method according to claim 22 including using one of a plurality of different read/write channels, which one of the plurality of read/write channels cannot be determined by the external network.

25. The method according to claim 22 wherein for at least one of the received messages:
transmitting internal control messages between the plurality of input processing modules and the plurality of control processing modules using a first communication channel;
signing each of the internal control messages before proceeding with transmission of any data portions of the at least one of the received messages;
transmitting certain data portions of the received message between the input processing modules within the input system and the execution processing modules within the execution system using a second communication channel that is different than the first communication channel.

26. The method according to claim 22 further including:
periodically providing a heartbeat update internal control message to the plurality of control processing modules within the control system from the plurality of input processing modules within the input system and the plurality of execution processing modules within the execution system; and
upon detection of the absence of the heartbeat update internal control message, disallowing any further external message being validated until resolution of the absence of the heartbeat update internal control message.

27. The method according to claim 22 wherein for at least one of the received messages, an attack is detected and data portions within the at least one received message are not transmitted onto the multi-channel internal communication bus and are not received by either of the plurality of control processing modules within the control system or the plurality of execution processing modules within the execution system, thereby segmenting and isolating the plurality of control processing modules within the control system and the plurality of execution processing modules within the execution system from the received message.

28. The method according to claim 1 wherein each different attack surface is presented at different intervals by configuring the plurality of execution processing modules within the execution system, each which have different hardware therein.

29. The method according to claim 28, including receiving some of the received plurality of external messages at the plurality of execution processing modules within the execution system, wherein the plurality of execution processing modules within the execution system has at least one difference from a set of characteristics, the set of characteristics including operating system, library, application and kernel.

30. The method according to claim 28 wherein for at least one of the received messages:
transmitting internal control messages within the control system between the plurality of input processing modules within the input system and the plurality of control processing modules within the control system using a first communication channel;
signing each of the internal control messages before proceeding with transmission of any data portions of the at least one of the received messages;
transmitting certain data portions of the received message between the input processing modules and the execution processing modules using a second communication channel that is different than the first communication channel.

31. The method according to claim 28 further including:
periodically providing a heartbeat update internal control message to the plurality of control processing modules within the control system from the plurality of input processing modules within the input system and the plurality of execution processing modules within the execution system; and
upon detection of the absence of the heartbeat update internal control message, disallowing any further external message being validated until resolution of the absence of the heartbeat update internal control message.

32. The method according to claim 28 wherein for at least one of the received messages, an attack is detected and data portions within the at least one received message are not transmitted onto the multi-channel internal communication bus and are not received by either of the plurality of control processing modules within the control system or the plurality of execution processing modules within the execution system, thereby segmenting and isolating the plurality of control processing modules within the control system and the plurality of execution processing modules within the execution system from the received message.

33. The method according to claim 1 wherein each different attack surface is presented at different intervals by configuring a plurality of user processing modules within a user system, each which have different hardware therein.

34. The method according to claim 33, including receiving some of the received plurality of external messages at the plurality of user processing modules within the user system, wherein the plurality of user processing modules within the user system has at least one difference from a set of characteristics, the set of characteristics including operating system, library, application and kernel.

35. The method according to claim 33 wherein for at least one of the received messages:
transmitting internal control messages between the plurality of input processing modules within the input system and the plurality of control processing modules within the control system using a first communication channel;
signing each of the internal control messages before proceeding with transmission of any data portions of the at least one of the received messages;
transmitting certain data portions of the received message between the input processing modules within the input system and the execution processing modules within the execution system using a second communication channel that is different than the first communication channel.

36. The method according to claim 33 further including:
periodically providing a heartbeat update internal control message to the plurality of control processing modules within the control system from the plurality of input processing modules within the input system and the plurality of execution processing modules within the execution system; and
upon detection of the absence of the heartbeat update internal control message, disallowing any further external message being validated until resolution of the absence of the heartbeat update internal control message.

37. The method according to claim 33 wherein for at least one of the received messages, an attack is detected and data portions within the at least one received message are not transmitted onto the multi-channel internal communication bus and are not received by either of the plurality of control processing modules within the control system or the plurality of execution processing modules within the execution system, thereby segmenting and isolating the plurality of control processing modules within the control system and the plurality of execution processing modules within the execution system from the received message.

38. An apparatus configured to provide for security from an external attack brought over an external communication network or a user input during a period of time, whereby the apparatus also receives a plurality of external messages over the period of time, the apparatus comprising:
an input processor within an input system that includes a plurality of input processing modules within the input system that receives the plurality of external messages over the period of time at the plurality of input processing modules within the input system, each of the plurality of input processing modules within the input system being executable by a different processor and the different processor executing a different operating system that are each different from each other, and wherein the plurality of input processing modules within the input system validates each of the plurality of external messages and invalidates the external attack;
a control processor within a control system to configure the plurality of input processing modules within the input system to each present a different attack surface at different intervals within the period of time to the received plurality of external messages from the external communications network, and thereby to the external attack, each different attack surface corresponding to a different processor executing a different instruction set and a different operating system, wherein the control processor within the control system includes a plurality of processors and operating systems that are each different from the plurality of input processing modules within the input system, and wherein the control processor within the control system is not directly connected to the external communication network;
an execution processor within an execution system that includes a plurality of execution processing modules and a plurality of processors that execute a plurality of applications;
a multi-channel internal communication bus for connecting the input processor within the input system, the control processor within the control system, and the execution processor within the execution system for data and control transmissions therebetween; and, wherein:

for each received external message, message processing occurs only after each received external message is validated;
upon validation, transmitting certain data portions of each received message using the multichannel internal communication bus to the execution processor within the execution system; and
executing solely within the execution processor within the execution system a corresponding one of the plurality of applications using the certain data portions.

39. The apparatus according to claim 38 wherein the input processor further includes a multiplexor that selectively transmits each of the received external messages to at least one of the plurality of input processing modules within the input system.

40. The apparatus according to claim 38 wherein the multi-channel internal communication bus includes a plurality of parallel channels that each support a hash being applied to a message communicated thereon.

41. The apparatus according to claim 38 further including at least one cryptographic security module that stores cryptographic keys.

42. The apparatus according to claim 38 wherein a message received at the input processor within the input system is segmented and isolated from the control processor within the control system and the execution processor within the execution system at receipt.

43. The apparatus according to claim 38, further including a user processor within a user system that receives each of a plurality of user input messages, which plurality of user input messages is not received at the control processor within the control system and is not received at the execution processor within the execution system.

44. The apparatus according to claim 38 being further configured to include a user processor that includes a plurality of user processing modules within a user system that receives the plurality of external messages over the period of time at the plurality of user processing modules within the user system, each of the plurality of user processing modules being executable by a different processor and the different processor executing a different operating system that are each different from each other.

45. A Dynamic Security Architecture Environment (DSAE) system configured to provide for security from an external attack brought over an external communication network or a user input during a period of time, whereby the system also receives a plurality of external messages over the period of time, the system comprising:
an input processor within an input system that includes a plurality of input processing modules within the input system that receives the plurality of external messages over the period of time at the plurality of input processing modules within the input system, each of the plurality of input processing modules within the input system being executable by a different processor and the different processor executing a different operating system that are each different from each other, and wherein the plurality of input processing modules within the input system validates each of the plurality of external messages and invalidates the external attack;
a control processor within a control system to configure the plurality of input processing modules within the input system to each present a different attack surface at different intervals within the period of time to the received plurality of external messages from the external communications network, and thereby to the external attack, each different attack surface corresponding to a different processor executing a different instruction set and a different operating system, wherein the control processor within the control system includes a plurality of processors and operating systems that are each different from the plurality of input processing modules within the input system, and wherein the control processor within the control system is not directly connected to the external communication network;

an execution processor within an execution system that includes a plurality of execution processing modules and a plurality of processors that execute a plurality of applications;

a user processor within a user system that receives each of a plurality of user input messages, which plurality of user input messages is not received at the control processor within the control system and is not received at the execution processor within the execution system;

a multi-channel internal communication bus for connecting the input processor within the input system, the control processor within the control system, the execution processor within the execution system, and the user processor within the user system for data and control transmissions therebetween; and, wherein:

for each received external message, message processing occurs only after each received external message is validated;

upon validation, transmitting certain data portions of each received message using the multichannel internal communication bus to the execution processor within the execution system; and executing solely within the execution processor within the execution system a corresponding one of the plurality of applications using the certain data portions.

46. The system according to claim 45 wherein the input processor further includes a multiplexor that selectively transmits each of the received external messages to at least one of the plurality of input processing modules within the input system.

* * * * *